(12) United States Patent
Rosenberg et al.

(10) Patent No.: US 6,169,540 B1
(45) Date of Patent: *Jan. 2, 2001

(54) METHOD AND APPARATUS FOR DESIGNING FORCE SENSATIONS IN FORCE FEEDBACK APPLICATIONS

(75) Inventors: Louis B. Rosenberg, Pleasanton; Dean C. Chang, Palo Alto, both of CA (US)

(73) Assignee: Immersion Corporation, San Jose, CA (US)

( * ) Notice: Under 35 U.S.C. 154(b), the term of this patent shall be extended for 0 days.

This patent is subject to a terminal disclaimer.

(21) Appl. No.: 08/877,114

(22) Filed: Jun. 17, 1997

Related U.S. Application Data

(63) Continuation-in-part of application No. 08/566,282, filed on Dec. 1, 1995, now Pat. No. 5,734,373, and application No. 08/846,011, filed on Apr. 25, 1997.

(51) Int. Cl.[7] ..................................................... G06F 3/033

(52) U.S. Cl. ........................ 345/326; 345/157; 345/161

(58) Field of Search ................................. 345/146, 156, 345/157, 161, 163, 326, 333; 318/568.11, 568.25; 74/471 XY; 463/30, 37, 38; 434/45; 395/99; 244/233

(56) References Cited

U.S. PATENT DOCUMENTS

| 3,919,691 | 11/1975 | Noll ................................. 340/172.5 |
| 4,477,043 | 10/1984 | Repperger ............................ 244/223 |
| 4,800,721 | 1/1989 | Cemenska et al. .................... 60/393 |

(List continued on next page.)

FOREIGN PATENT DOCUMENTS

| 0626634A2 | 11/1994 | (EP) . |
| 0875819 | 4/1998 | (EP) . |
| WO9502801 | 1/1995 | (WO) . |
| WO9520788 | 8/1995 | (WO) . |
| WO9532459 | 11/1995 | (WO) . |
| WO9731333 | 8/1997 | (WO) . |

OTHER PUBLICATIONS

Ouh–young, Ming et al., "Creating an Illusion of Feel: Control Issues in Force Display," University of N. Carolina, 1989, pp. 1–14.

Colgate, J. Edward et al., "Implementation of Stiff Virtual Walls in Force–Reflecting Interfaces," Northwestern University, 1993.

Kelley et al., Magic Mouse: Tactile & Kinesthetic Feedback in the Human–Computer Interface using as Electromagnetically Acutuated Input/Output Device, 1993, University British Columbia.

(List continued on next page.)

Primary Examiner—Jeffrey Brier
(74) Attorney, Agent, or Firm—James R. Riegel

(57) ABSTRACT

A design interface tool for designing force sensations for use with a host computer and force feedback interface device. A force feedback device is connected to a host computer that displays the interface tool. Input from a user is received in the interface to select a type of force sensation to be commanded by a host computer and output by a force feedback interface device. Input, such as parameters, is then received from the user which designs and defines physical characteristics of the selected force sensation. A graphical representation of the characterized force sensation is displayed on the host computer which provides a visual demonstration of a feel of the characterized force sensation so that the user can view an effect of parameters on said force sensation. The characterized force sensation is output to a user manipulatable object of the force feedback device so that the user can feel the designed force sensation, where the graphical representation is updated in conjunction with the output of the force sensation. The user can iteratively modify force sensation characteristics and feel the results, and store the characterized force sensations.

74 Claims, 25 Drawing Sheets

U.S. PATENT DOCUMENTS

| | | | |
|---|---|---|---|
| 4,868,549 | 9/1989 | Affinito et al. | 340/710 |
| 4,896,554 | 1/1990 | Culver | 74/471 XY |
| 4,907,973 | 3/1990 | Hon | 434/262 |
| 4,935,728 | 6/1990 | Kley | 340/709 |
| 5,044,956 | 9/1991 | Behensky et al. | 434/45 |
| 5,076,517 | 12/1991 | Ferranti et al. | 244/228 |
| 5,103,404 | 4/1992 | McIntosh | 318/568.22 |
| 5,116,180 | 5/1992 | Fung et al. | 414/5 |
| 5,146,566 | 9/1992 | Hollis, Jr. et al. | 395/275 |
| 5,185,561 | 2/1993 | Good et al. | 318/432 |
| 5,186,629 | 2/1993 | Rohen | 434/114 |
| 5,193,963 | 3/1993 | McAffee et al. | 414/5 |
| 5,220,260 | 6/1993 | Schuler | 318/561 |
| 5,223,776 | 6/1993 | Radke et al. | 318/568.1 |
| 5,235,868 | 8/1993 | Culver | 74/471 XY |
| 5,341,459 | 8/1994 | Backes | 395/95 |
| 5,354,162 | 10/1994 | Burdea et al. | 414/5 |
| 5,389,865 | 2/1995 | Jacobus et al. | 318/568.11 |
| 5,405,152 | 4/1995 | Katanics et al. | 273/438 |
| 5,414,337 | 5/1995 | Schuler | 318/561 |
| 5,451,924 | 9/1995 | Massimino et al. | 340/407.1 |
| 5,482,051 | 1/1996 | Reddy et al. | 128/733 |
| 5,513,100 | 4/1996 | Parker et al. | 364/167.01 |
| 5,526,480 | 6/1996 | Gibson | 395/154 |
| 5,550,562 | 8/1996 | Aoki et al. | 345/163 |
| 5,551,701 | * 9/1996 | Bouton et al. | 345/161 |
| 5,576,727 | 11/1996 | Rosenberg et al. | 345/179 |
| 5,589,854 | 12/1996 | Tsai | 345/161 |
| 5,596,347 | 1/1997 | Robertson et al. | 345/145 |
| 5,625,576 | 4/1997 | Massie et al. | 364/578 |
| 5,629,594 | 5/1997 | Jacobus et al. | 318/568.11 |
| 5,642,469 | 6/1997 | Hannaford et al. | 395/99 |
| 5,643,087 | 7/1997 | Marcus et al. | 463/38 |
| 5,666,138 | 9/1997 | Culver | 345/161 |
| 5,666,473 | 9/1997 | Wallace | 345/420 |
| 5,691,898 | 11/1997 | Rosenberg et al. | 364/190 |
| 5,709,219 | 1/1998 | Chen et al. | 128/782 |
| 5,714,978 | 2/1998 | Yamanaka et al. | 345/157 |
| 5,721,566 | 2/1998 | Rosenberg et al. | 345/161 |
| 5,734,373 | 3/1998 | Rosenberg et al. | |
| 5,739,811 | 4/1998 | Rosenberg et al. | 345/161 |
| 5,742,278 | 4/1998 | Chen et al. | 345/156 |
| 5,754,023 | 5/1998 | Rosten et al. | 318/561 |
| 5,755,577 | 5/1998 | Gillio | 434/262 |
| 5,760,764 | 6/1998 | Martinelli | 345/160 |
| 5,767,839 | 6/1998 | Rosenberg | 345/161 |
| 5,769,640 | 6/1998 | Jacobus et al. | 434/262 |
| 5,781,172 | 7/1998 | Engel et al. | 345/164 |
| 5,790,108 | 8/1998 | Salcudean et al. | 345/184 |
| 5,802,353 | 9/1998 | Avila et al. | 395/500 |
| 5,805,140 | 9/1998 | Rosenberg et al. | 345/161 |
| 5,808,601 | 9/1998 | Leah et al. | 345/145 |
| 5,825,308 | 10/1998 | Rosenberg | 341/20 |
| 5,831,408 | 11/1998 | Jacobus et al. | 318/568.11 |
| 5,844,392 | 12/1998 | Peurach et al. | 318/568.17 |
| 5,889,670 | 3/1999 | Schuler et al. | 364/186 |
| 5,959,613 | 9/1999 | Rosenberg et al. | 345/161 |

OTHER PUBLICATIONS

Hirota et al., "Development Of Surface Display," University Tokyo, IEEE, 1993, pp. 256–262.

Payette et al., "Evaluation Of Force Feedback Computer Pointing device in Zero Gravity," DSC–vol. 58, Proc. of ASME Dynamics Systems and Control Division, 1996, pp. 547–553.

Russo, Massimo, "The Design & Implementation of a Three Degree of Freedom Force Output Joystick," Dept. of Mech. Engineering, 1990, pp. 1–40.

Schmult, B. et al., "Application Areas for a Force–Feedback Joystick," DSC–vol. 49, Advances in Robotics Mechatronics, and Haptic Interfaces, ASME 1993, pp. 47–54.

Atkinson, W. et al., "Computing with Feeling," Comp. & Graphics, vol. 2, 1976, pp. 97–103.

Kelley et al., "On the Development of a Force–Feedback Mouse & It's Integration into a Graphical User Interface," Int'l Mechanical Engineering Congress and Exhibition, 1994, pp. 1–8.

Minsky, Margaret et al., "Feeling & Seeing: Issues in Force Display, " ACM 1990, pp. 235–242, 270.

Rosenberg et al., "The use of force feedback to enhance graphical user interfaces," Stereoscopic Displays and Virtual Reality Systems, Proc. SPIE, 1996, pp. 243–248.

Hannanford et al., "Force Feedback Cursor Control," NASA Tech Brief, vol. 13, No. 11, Item #21, 1989, pp. 1–4.

Brooks Jr., Frederick et al., "Project GROPE–Haptic Displays for Scientific Visualization," Computer Graphics, vol. 24, No. 4, 1990, pp. 177–185.

Adelstein, B. et al., "Design & Implementation of a Force Reflecting Manipulandum for Manual Control Research," NASA Ames Research, 1992, pp. 1–24.

Winey III et al., "Computer Simulated Visual & Tactile Feedback as an aid to Manipulator & Vehicle Control," MIT, 1981, pp. 1–79.

Kilpatrick et al., "The Use of Kinesthetic Supplement in an Interactive Graphics System," University of North Carolina, 1976, pp. 1–174.

Rosenberg et al., "Perceptual Decomposition of Virtual Haptic Surfaces," Proc. IEEE Symposium on Research Frontiers in Virtual Reality, 1993.

Rosenberg, "Virtual haptic Overlays enhance performance in telepresence tasks," Stanford University, 1994.

Ouh–Young et al., "Using A Manipulator for Force Display in Molecular Docking," University North Carolina, IEEE 1988, pp. 1824–1829.

Bejczy et al., "The Phantom Robot: Predictive Displays in Molecular Docking," CA Institute of Technology, IEEE 1990, pp. 546–550.

Munch et al., "Intelligent Control for Haptic Displays," Eurographics '96, Blackwell Publishers, vol. 15, No. 3, 1996, pp. C–217–226.

Akamatsu et al., "Multimodal Mouse: A Mouse–Type Device with Tactile & Force Display," Presence, vol. 3, No. 1, 1994, pp. 73–80.

Tan, Hong et al., "Human Factors for the Design of Force–Reflecting Haptic Interfaces," MIT, 1994.

Jones, L.A. et al., "A Perceptual Analysis of Stiffness," Experimental Brain Research (1990) 79:150–156.

Hiroo Iwata, "Artificial Reality with Force–Feedback: Development of Desktop Virtual Space with Compact Master Manipulator," Computer Graphics, vol. 24, No. 4, 1990, pp. 165–170.

Rosenberg et al., "Commercially Viable Force Feedback Controller for Individuals with Neuromotor Disabilities," Crew Systems Directorate, AL/CF–TR–1997–0016,1996, pp. 1–33.

Su, S. Augustine et al., "The Virtual Panel Architecture: A 3D Gesture Framework," IEEE 1993, pp. 387–393.

Rosenberg, L., "Perceptual Design of a Virtual Rigid Surface Contact," Air Force Material Command, AL/CF–TR–1995–0029, 1993, pp. 1–39.

Rosenberg, L., "The Use of Fixtures to Enhance Operator Performance in Time Delayed Teleoperation," Air Force Material Command, AL/CF–TR–1994–0139, 1993, pp. 1–45.

* cited by examiner

Fig. 17

METHOD AND APPARATUS FOR DESIGNING FORCE SENSATIONS IN FORCE FEEDBACK APPLICATIONS

CROSS REFERENCE TO RELATED APPLICATIONS

This application is a continuation-in-part of parent patent applications Ser. No. 08/566,282, filed Dec. 1, 1995, now U.S. Pat. No. 5,734,373 on behalf of Louis B. Rosenberg et al., entitled, "Method and Apparatus for Controlling Force Feedback Interface Systems Utilizing a Host Computer," and Ser. No. 08/846,011, filed Apr. 25, 1997, on behalf of Rosenberg et al., entitled, "Method and Apparatus for Designing and Controlling Force Sensations in Force Feedback Computer Applications" both assigned to the assignee of this present application, and both of which are incorporated by reference herein in their entirety.

BACKGROUND OF THE INVENTION

The present invention relates generally to interface devices for allowing humans to interface with computer systems, and more particularly to computer interface devices that allow the user to provide input to computer systems and allow computer systems to provide force feedback to the user.

Users interact with computer systems for a variety of reasons. A computer system typically displays a visual environment to a user on a display output device. Using an interface device, a user can interact with the displayed environment to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, stylus, tablet, pressure-sensitive ball, or the like, that is connected to the computer system controlling the displayed environment. Typically, the computer updates the environment in response to the user's manipulation of a user-manipulatable physical object such as a joystick handle or mouse, and provides visual and audio feedback to the user utilizing the display screen and audio speakers. The computer senses the user's manipulation of the user object through sensors provided on the interface device that send locative signals to the computer. For example, the computer displays a cursor, controlled vehicle, or other graphical object in a graphical environment, where the location or motion of the graphical object is responsive to the to the motion of the user object. The user can thus control the graphical object by moving the user object.

In some interface devices, tactile and/or haptic feedback is also provided to the user, more generally known as "force feedback." These types of interface devices can provide physical sensations which are felt by the user manipulating a user manipulable object of the interface device. For example, the Force-FX joystick controller from CH Products, Inc. and Immersion Corporation may be connected to a computer and provides forces to a user of the controller. Other systems might use a force feedback mouse controller. One or more motors or other actuators are coupled to the joystick or other user object and are connected to the controlling computer system. The computer system controls forces on the joystick in conjunction and coordinated with displayed events and interactions by sending control signals or commands to the actuators. The computer system can thus convey physical force sensations to the user in conjunction with other supplied feedback as the user is grasping or contacting the joystick or other object of the interface device. For example, when the user moves the manipulatable object and causes a displayed cursor to interact with a different displayed graphical object, the computer can issue a command that causes the actuator to output a force on the user object, conveying a feel sensation to the user.

A problem with the prior art development of force feedback sensations in software is that the programmer of force feedback applications does not have an intuitive sense as to how forces will feel when adjusted in certain ways, and thus must go to great effort to develop characteristics of forces that are desired for a specific application. For example, a programmer may wish to create a specific spring and damping force sensation between two graphical objects, where the force sensation has a particular stiffness, play, offset, etc. In current force feedback systems, the programmer must determine the parameters and characteristics of the desired force by a brute force method, by simply setting parameters, testing the force, and adjusting the parameters in an iterative fashion. This method is cumbersome because it is often not intuitive how a parameter will affect the feel of a force as it is actually output on the user object; the programmer often may not even be close to the desired force sensation with initial parameter settings. Other types of forces may not be intuitive at all, such as a spring having a negative stiffness, and thus force sensation designers may have a difficult time integrating these types of sensations into software applications. Thus, a tool is needed for assisting the programmer or developer in intuitively and easily setting force feedback characteristics to provide desired force sensations.

SUMMARY OF THE INVENTION

The present invention is directed to designing force sensations output by a force feedback interface device. A controlling host computer provides a design interface tool that allows intuitive and simple design of a variety of force sensations.

More particularly, a design interface for designing force sensations for use with a force feedback interface device is described. The force sensation design interface is displayed on a display device of a host computer. Input from a user is received in the interface, where the input selects a type of force sensation to be commanded by a host computer and output by a force feedback interface device. Input, such as parameters, is then received from a user which designs and defines physical characteristics of the selected force sensation. A graphical representation of the characterized force sensation is displayed on a display device of the host computer. The graphical representation provides the user with a visual demonstration of a feel of the characterized force sensation such that said user can view an effect of parameters on said force sensation. The characterized force sensation is output to a user manipulatable object of the force feedback interface device such that the user can feel the designed force sensation. The graphical representation is updated in conjunction with the force sensation being output on the user object, promoting further understanding of the effects of the characterization on the output force sensation. The user can preferably input additional changes to the characterized forces sensation after experiencing the feel of the sensation and feel the changed force sensation. Thus, in an iterative process, the user can design effective force sensations through actual experience of those sensations. The user can preferably store the characterization or parameters of the designed force sensation to a storage medium that can be accessed by other programs on the host computer or other computers. Other programs that control force feedback can thus utilize the designed force sensation in applications such as games, simulations, or graphical interfaces.

A wide variety of types of force sensations can be designed in the interface tool of the present invention. Described types include conditions, effects, and dynamics. Some force sensations include a simple mode of graphical representation that is more intuitive but offers less control over parameters that an advanced mode. In the advanced mode, a force versus user object motion profile is displayed, where the user may adjust parameters of the selected force sensation by dragging displayed control points of the profile. Represented force sensations include a damping condition, a spring condition, a slope condition, a texture condition, and periodic waves. The user can also design compound force sensations including multiple single force sensations. For example, a preferred graphical representation of a slope condition includes a hill image and a ball image, where the user moves the ball with the user object. The force on the ball provided by a negative spring stiffness is intuitively analogized by the visual representation of the ball rolling down the hill and feeling the appropriate forces. In one embodiment, the force feedback interface device includes a microprocessor separate from the host computer system. The microprocessor receives commands from the host computer system, reads sensors of the interface device and reports positions of said user object to the host computer, and commands actuators of the interface device to output the force sensation on the user object.

The present invention advantageously provides a simple, easy-to-use design interface tool for designing force feedback sensations. Given the large variety of possible force sensations and the often unexpected results when modifying the several parameters of force sensations, the design interface tool of the present invention meets the needs of force sensation designers that wish to create force sensations as close to their needs as possible. The graphical design interface of the present invention allows a force sensation programmer or developer to easily and intuitively design force sensations, conveniently experience the designed force sensations, and visually understand the effect of changes to different aspects of the force sensations.

These and other advantages of the present invention will become apparent to those skilled in the art upon a reading of the following specification of the invention and a study of the several figures of the drawing.

BRIEF DESCRIPTION OF THE DRAWINGS

FIGS. 16–17 are diagrams of the interface of FIG. 5 in which a simple mode design window for a spring condition is displayed;

DETAILED DESCRIPTION OF PREFERRED EMBODIMENTS

Figure 1:
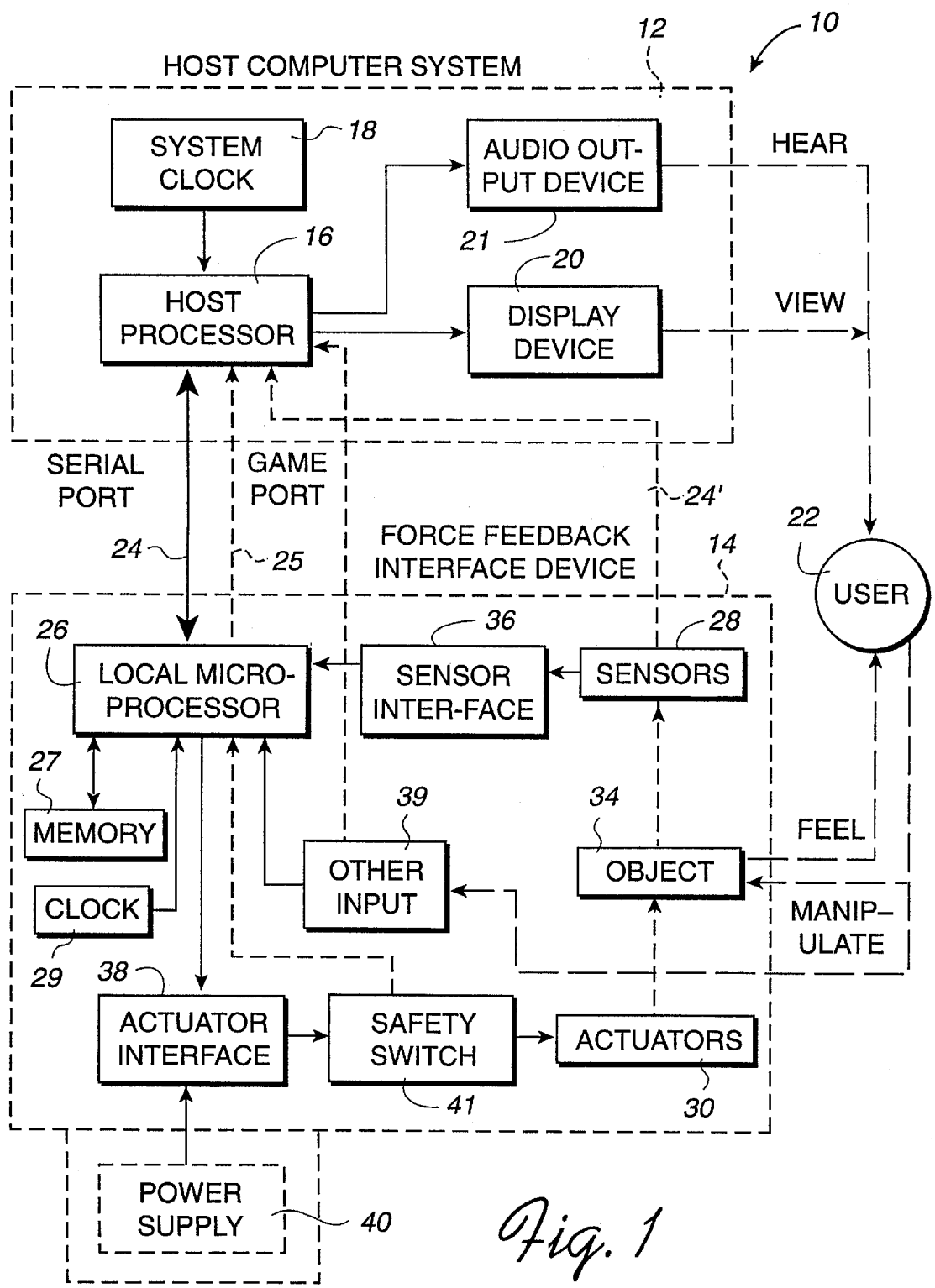
FIG. 1 is a block diagram of a system for controlling a force feedback interface device of the present invention.

FIG. 1 is a block diagram illustrating a force feedback interface system 10 of the present invention controlled by a host computer system. Interface system 10 includes a host computer system 12 and an interface device 14.

Host computer system 12 is preferably a personal computer, such as an IBM-compatible or Macintosh personal computer, or a workstation, such as a SUN or Silicon Graphics workstation. For example, the host computer system can a personal computer which operates under the MS-DOS or Windows operating systems in conformance with an IBM PC AT standard. Alternatively, host computer system 12 can be one of a variety of home video game systems commonly connected to a television set, such as systems available from Nintendo, Sega, or Sony. In other embodiments, home computer system 12 can be a television "set top box" or a "network computer" which can be used, for example, to provide interactive computer functions to users over networks.

In the described embodiment, host computer system 12 implements a host application program with which a user 22 is interacting via peripherals and interface device 14. For example, the host application program can be a video game, medical simulation, scientific analysis program, operating system, graphical user interface, or other application program that utilizes force feedback. Typically, the host application provides images to be displayed on a display output device, as described below, and/or other feedback, such as auditory signals.

Host computer system 12 preferably includes a host microprocessor 16, random access memory (RAM) 17, read-only memory (ROM) 19, input/output (I/O) electronics 21, a clock 18, a display screen 20, and an audio output device 21. Host microprocessor 16 can include a variety of available microprocessors from Intel, AMD, Motorola, or other manufacturers. Microprocessor 16 can be single microprocessor chip, or can include multiple primary and/or coprocessors. Microprocessor preferably retrieves and stores instructions and other necessary data from RAM 17 and ROM 19, as is well known to those skilled in the art. In the described embodiment, host computer system 12 can receive locative data or a sensor signal via a bus 24 from sensors of interface device 14 and other information. Microprocessor 16 can receive data from bus 24 using I/O electronics 21, and can use I/O electronics to control other peripheral devices. Host computer system 12 can also output a "force command" to interface device 14 via bus 24 to cause force feedback for the interface device.

Clock 18 is a standard clock crystal or equivalent component used by host computer system 12 to provide timing to electrical signals used by microprocessor 16 and other components of the computer system. Clock 18 is accessed by host computer system 12 in the force feedback control process, as described subsequently.

Display screen 20 is coupled to host microprocessor 16 by suitable display drivers and can be used to display images generated by host computer system 12 or other computer systems. Display screen 20 can be a standard display screen, CRT, flat-panel display, 3-D goggles, or any other visual interface. In a described embodiment, display screen 20 displays images of a simulation or game environment. In other embodiments, other images can be displayed. For example, images describing a point of view from a first-person perspective can be displayed, as in a virtual reality simulation or game. Or, images describing a third-person perspective of objects, backgrounds, etc. can be displayed. A user 22 of the host computer 12 and interface device 14 can receive visual feedback by viewing display screen 20.

Herein, computer 12 may be referred as displaying computer or graphical "objects" or "entities". These computer objects are not physical objects, but is a logical software unit collections of data and/or procedures that may be displayed as images by computer 12 on display screen 20, as is well known to those skilled in the art. For example, a cursor or a third-person view of a car might be considered player-controlled computer objects that can be moved across the screen. A displayed, simulated cockpit of an aircraft might also be considered an "object", or the simulated aircraft can be considered a computer-implemented "entity".

Audio output device 21, such as speakers, is preferably coupled to host microprocessor 16 via amplifiers, filters, and other circuitry well known to those skilled in the art and provides sound output to user 22 from the host computer 18. Other types of peripherals can also be coupled to host processor 16, such as storage devices (hard disk drive, CD ROM drive, floppy disk drive, etc.), printers, and other input and output devices.

An interface device 14 is coupled to host computer system 12 by a bi-directional bus 24. The bi-directional bus sends signals in either direction between host computer system 12 and the interface device. Herein, the term "bus" is intended to generically refer to an interface such as between host computer 12 and microprocessor 26 which typically includes one or more connecting wires, wireless connection, or other connections and that can be implemented in a variety of ways. In the preferred embodiment, bus 24 is a serial interface bus providing data according to a serial communication protocol. An interface port of host computer system 12, such as an RS232 or Universal Serial Bus (USB) serial interface port, connects bus 24 to host computer system 12. Other standard serial communication protocols can also be used in the serial interface and bus 24, such as RS-422, MIDI, or other protocols well known to those skilled in the art. The USB can also source power to drive peripheral devices and may also provide timing data that is encoded along with differential data.

Alternatively, a parallel port of host computer system 12 can be coupled to a parallel bus 24 and communicate with interface device using a parallel protocol, such as SCSI or PC Parallel Printer Bus. Also, bus 24 can be connected directly to a data bus of host computer system 12 using, for example, a plug-in card and slot or other access of computer 12. Bus 24 can be implemented within a network such as the Internet or LAN; or, bus 24 can be a channel such as the air, etc. for wireless communication. In another embodiment, an additional bus 25 can be included to communicate between host computer system 12 and interface device 14. For example, bus 24 can be coupled to the standard serial port of host computer 12, while an additional bus 25 can be coupled to a second port of the host computer system, such as a "game port." The two buses 24 and 25 can be used simultaneously to provide a increased data bandwidth.

Interface device 14 includes a local microprocessor 26, sensors 28, actuators 30, a user object 34, optional sensor interface 36, an optional actuator interface 38, and other optional input devices 39. Interface device 14 may also include additional electronic components for communicating via standard protocols on bus 24. In the preferred embodiment, multiple interface devices 14 can be coupled to a single host computer system 12 through bus 24 (or multiple buses 24) so that multiple users can simultaneously interface with the host application program (in a multi-player game or simulation, for example). In addition, multiple players can interact in the host application program with multiple interface devices 14 using networked host computers 12, as is well known to those skilled in the art.

Local microprocessor 26 is coupled to bus 24 and is preferably included within the housing of interface device 14 to allow quick communication with other components of the interface device. Processor 26 is considered local to interface device 14, where "local" herein refers to processor 26 being a separate microprocessor from any processors in host computer system 12. "Local" also preferably refers to processor 26 being dedicated to force feedback and sensor I/O of interface device 14, and being closely coupled to sensors 28 and actuators 30, such as within the housing for interface device or in a housing coupled closely to interface device 14. Microprocessor 26 can be provided with software instructions to wait for commands or requests from computer host 16, decode the command or request, and handle/control input and output signals according to the command or request. In addition, processor 26 preferably operates independently of host computer 16 by reading sensor signals and calculating appropriate forces from those sensor signals, time signals, and stored or relayed instructions selected in accordance with a host command. Suitable microprocessors for use as local microprocessor 26 include the MC68HC711E9 by Motorola, the PIC16C74 by Microchip, and the 82930AX by Intel Corp., for example. Microprocessor 26 can include one microprocessor chip, or multiple processors and/or co-processor chips. In other embodiments, microprocessor 26 can include digital signal processor (DSP) capability.

Microprocessor 26 can receive signals from sensors 28 and provide signals to actuators 30 of the interface device 14 in accordance with instructions provided by host computer 12 over bus 24. For example, in a preferred local control embodiment, host computer system 12 provides high level supervisory commands to microprocessor 26 over bus 24, and microprocessor 26 manages low level force control loops to sensors and actuators in accordance with the high level commands and independently of the host computer 18. This operation is described in greater detail with respect to FIG. 4. Microprocessor 26 can also receive commands from any other input devices 39 included on interface apparatus 14 and provides appropriate signals to host computer 12 to indicate that the input information has been received and any information included in the input information.

Local memory 27, such as RAM and/or ROM, is preferably coupled to microprocessor 26 in interface device 14 to store instructions for microprocessor 26 and store temporary and other data. In addition, a local clock 29 can be coupled to the microprocessor 26 to provide timing data, similar to system clock 18 of host computer 12; the timing data might be required, for example, to compute forces output by actuators 30 (e.g., forces dependent on calculated velocities or other time dependent factors). Timing data for microprocessor 26 can be alternatively retrieved from a USB signal on bus 24.

In the preferred embodiment, sensors 28, actuators 30, and microprocessor 26, and other related electronic components are included in a housing for interface device 14, to which user object 34 is directly or indirectly coupled. Alternatively, microprocessor 26 and/or other electronic components of interface device 14 can be provided in a separate housing from user object 34, sensors 28, and actuators 30. Also, additional mechanical structures may be included in interface device 14 to provide object 34 with desired degrees of freedom. Embodiments of mechanisms are described with reference to FIGS. 2a–b and 3.

Sensors 28 sense the position, motion, and/or other characteristics of a user object 34 of the interface device 14 along one or more degrees of freedom and provide signals to microprocessor 26 including information representative of those characteristics. Typically, a sensor 28 is provided for each degree of freedom along which object 34 can be moved. Alternatively, a single compound sensor can be used to sense position or movement in multiple degrees of freedom. An example of sensors suitable for several embodiments described herein are digital optical encoders, which sense the change in position of an object about a rotational axis and provide digital signals indicative of the change in position. A suitable optical encoder is the "Softpot" from U.S. Digital of Vancouver, Wash. Linear optical encoders, potentiometers, optical sensors, velocity sensors, acceleration sensors, strain gauge, or other types of sensors can also be used, and either relative or absolute sensors can be provided.

Sensors 28 provide an electrical signal to an optional sensor interface 36, which can be used to convert sensor signals to signals that can be interpreted by the microprocessor 26 and/or host computer system 12. Digital optical encoders, for example, can be used. If analog sensors 28 are used, an analog to digital converter (ADC) can convert the analog signal to a digital signal that is received and interpreted by microprocessor 26 and/or host computer system 12. In alternate embodiments, sensor signals from sensors 28 can be provided directly to host computer system 12 as shown by bus 24', bypassing microprocessor 26.

Actuators 30 transmit forces to user object 34 of the interface device 14 in one or more directions along one or more degrees of freedom in response to signals received from microprocessor 26. Typically, an actuator 30 is provided for each degree of freedom along which forces are desired to be transmitted. Actuators 30 can include two types: active actuators and passive actuators. Active actuators include linear current control motors, stepper motors, pneumatic/hydraulic active actuators, a torquer (motor with limited angular range), a voice coil actuators, and other types of actuators that transmit a force to move an object. For example, active actuators can drive a rotational shaft about an axis in a rotary degree of freedom, or drive a linear shaft along a linear degree of freedom. Passive actuators can also be used for actuators 30. Magnetic particle brakes, friction brakes, or pneumatic/hydraulic passive actuators can be used in addition to or instead of a motor to generate a damping resistance or friction in a degree of motion.

Actuator interface 38 can be optionally connected between actuators 30 and microprocessor 26. Interface 38 converts signals from microprocessor 26 into signals appropriate to drive actuators 30. Interface 38 can include power amplifiers, switches, digital to analog controllers (DACs), analog to digital controllers (ADC's), and other components, as is well known to those skilled in the art. In alternate embodiments, interface 38 circuitry can be provided within microprocessor 26, in actuators 30, or in host computer 12.

Other input devices 39 can optionally be included in interface device 14 and send input signals to microprocessor 26 or to host processor 16. Such input devices can include buttons, dials, switches, levers, or other mechanisms. For example, in embodiments where user object 34 is a joystick, other input devices can include one or more buttons provided, for example, on the joystick handle or base and used to supplement the input from the user to a game or simulation. The operation of such input devices is well known to those skilled in the art.

Power supply 40 can optionally be coupled to actuator interface 38 and/or actuators 30 to provide electrical power. Power supply 40 can be included within the housing of interface device 14, or be provided as a separate component. Alternatively, interface device 14 can draw power from the USB (if used) and thus have no (or reduced) need for power supply 40. Also, power from the USB can be stored and regulated by interface device 14 and thus used when needed to drive actuators 30. For example, power can be stored over time in a capacitor or battery and then immediately dissipated to provide a jolt force to the user object 34.

Safety switch 41 is optionally included in interface device 14 to provide a mechanism to allow a user to deactivate actuators 30, or require a user to activate actuators 30, for safety reasons. In the preferred embodiment, the user must continually activate or close safety switch 41 during operation of interface device 14 to enable the actuators 30. If, at any time, the safety switch is deactivated (opened), power from power supply 40 is cut to actuators 30 (or the actuators are otherwise disabled) as long as the safety switch is opened. For example, one embodiment of safety switch is an optical switch located on user object 34 or on a convenient surface of a housing of interface device 14. The switch is closed when the user covers the optical switch with a hand or finger, so that the actuators 30 will function as long as the user covers the switch. Safety switch 41 can also provide a signal directly to host computer 12. Other types of safety switches 41 can be provided in other embodiments, such as an electrostatic contact switch, a button or trigger, a hand weight safety switch, etc. If the safety switch 41 is not provided, actuator interface 38 can be directly coupled to actuators 30.

User manipulable object 34 ("user object") is a physical object, device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user 22 can manipulate and move the object along provided degrees of freedom to interface with the host application program the user is viewing on display screen 20. Object 34 can be a joystick, mouse, trackball, stylus (e.g. at the end of a linkage), steering wheel, sphere, medical instrument (laparoscope, catheter, etc.), pool cue (e.g. moving the cue through actuated rollers), hand grip, knob, button, or other article.

Figure 2A:
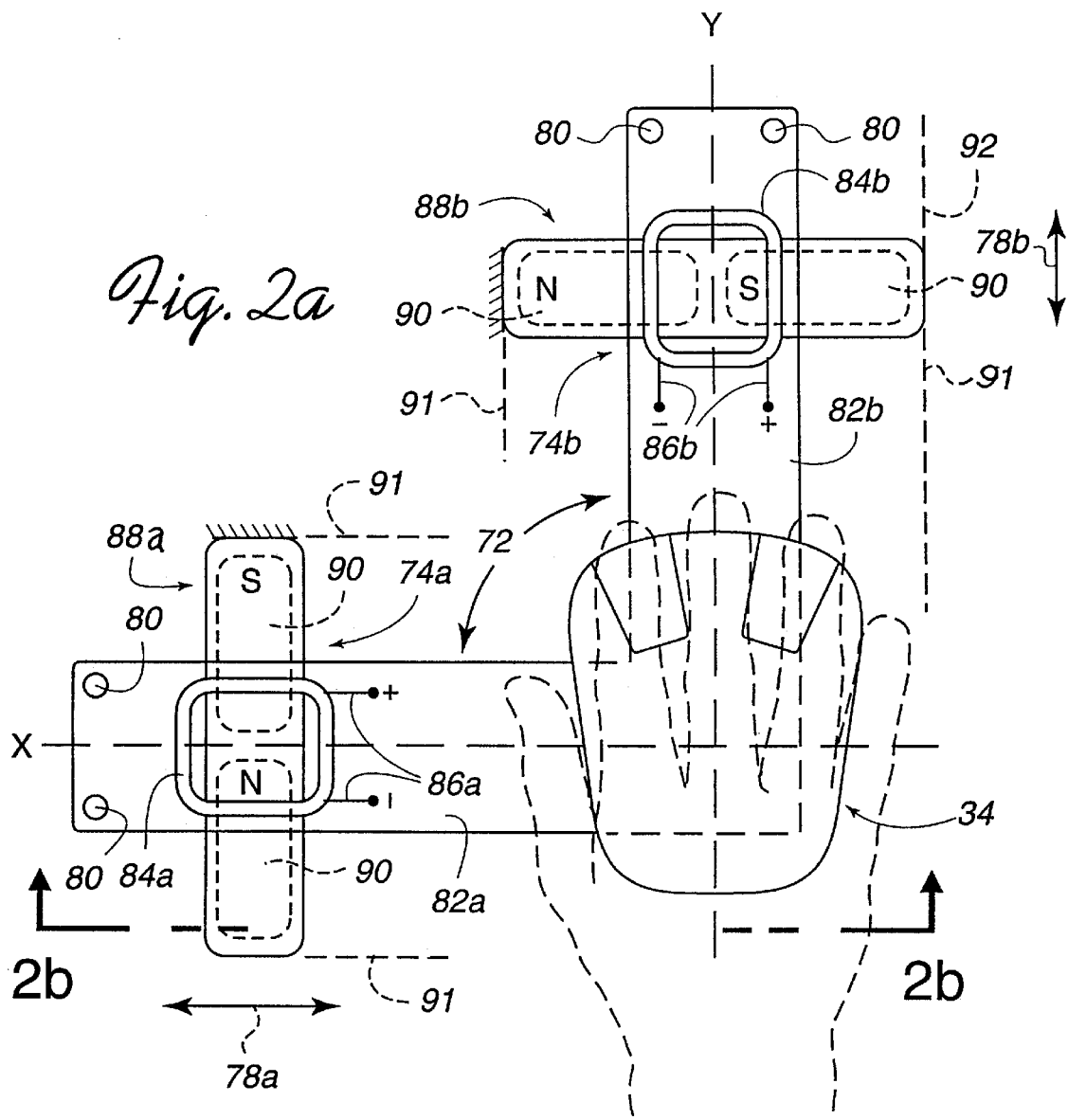
FIGS. 2a–b are top plan and side elevational views, respectively, of a first embodiment of a mechanism for interfacing a user manipulatable object with the force feedback device of FIG. 1.
Figure 2B:
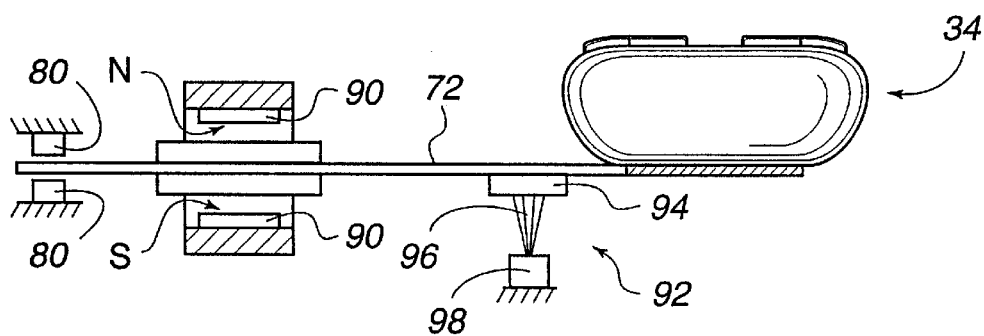

FIG. 2a is a top plan view and FIG. 2b is a side elevational view of one embodiment of an interface apparatus including a mechanical apparatus 70 and user object 34, in which electromagnetic voice coil actuators are used to provide forces to the user object. Such voice coil actuators are described in greater detail in co-pending patent application Ser. No. 08/560,091 now U.S. Pat. No. 5,805,140, incorporated by reference herein. Interface apparatus 70 provides two linear degrees of freedom to user object 34 so that the user can translate object 12 in a planar workspace along the X axis, along the Y axis, or along both axes (diagonal movement). This embodiment is thus preferred for use with a mouse, puck, or similar user object 34.

Apparatus 70 includes user object 34 and a board 72 that includes voice coil actuators 74a and 74b and guides 80. Object 34 is rigidly coupled to board 72, which, for example, can be a circuit board etched with conductive materials. Board 72 is positioned in a plane substantially parallel to the X-Y plane and floats. Board 72 and object 34 may thus be translated along axis X and/or axis Y, shown by arrows 78a and 78b and guided by guides 80, thus providing the object 34 with linear degrees of freedom. Board 72 is provided in a substantially right-angle orientation having one extended portion 82a at 90 degrees from the other extended portion 82b.

Voice coil actuators 74a and 74b are positioned on board 72 such that one actuator 74a is provided on portion 82a and the other actuator 74b is provided on portion 82b. Wire coil 84a of actuator 74a is coupled to portion 82a of board 72 and includes at least two loops etched onto board 72, preferably as a printed circuit board trace. Terminals 86a are coupled to actuator drivers, so that host computer 12 or microprocessor 26 can control the direction and/or magnitude of the current in wire coil 84a. Voice coil actuator 74a also includes a magnet assembly 88a, which preferably includes four magnets 90 and is grounded, where coil 84a is positioned between opposing polarities of the magnet.

The magnetic fields from magnets 90 interact with a magnetic field produced from wire coil 84a when current is flowed in coil 84a to produce forces. As an electric current I is flowed through the coil 84a via electrical connections 86a, a magnetic field is generated from the current and configuration of coil 84a. The magnetic field from the coil then interacts with the magnetic fields generated by magnets 90 to produce a force along axis Y. The magnitude or strength of the force is dependent on the magnitude of the current that is applied to the coil, the number of loops in the coil, and the magnetic field strength of the magnets. The direction of the force depends on the direction of the current in the coil. A voice coil actuator can be provided for each degree of freedom of the mechanical apparatus to which force is desired to be applied.

Limits 91 or physical stops can be positioned at the edges of the board 72 to provide a movement limit. Voice coil actuator 74b operates similarly to actuator 74a. In yet other embodiments, the translatory motion of board 72 along axes X and Y can be converted to two rotary degrees of freedom, or additional degrees of freedom can be similarly provided with voice-coil actuation, such as an up-down or spin degrees of freedom or spin along/about a z-axis.

Voice coil actuator 74a can also be used as a sensor to sense the velocity, position, and or acceleration of board 72 along axis Y. Motion of coil 84a along axis Y within the magnetic field of magnets 90 induces a voltage across the coil 84a, and this voltage can be sensed. This voltage is proportional to the velocity of the coil and board 72 along axis Y. From this derived velocity, acceleration or position of the board 72 can be derived. In other embodiments, separate digital sensors may be used to sense the position, motion, etc. of object 34 in low cost interface devices. For example, a lateral effect photo diode sensor 92 can be used, including a rectangular detector 94 positioned in a plane parallel to the X-Y plane onto which a beam of energy 96 is emitted from a grounded emitter 98. The position of the board 72 and object 34 can be determined by the location of the beam 96 on the detector.

Figure 3:
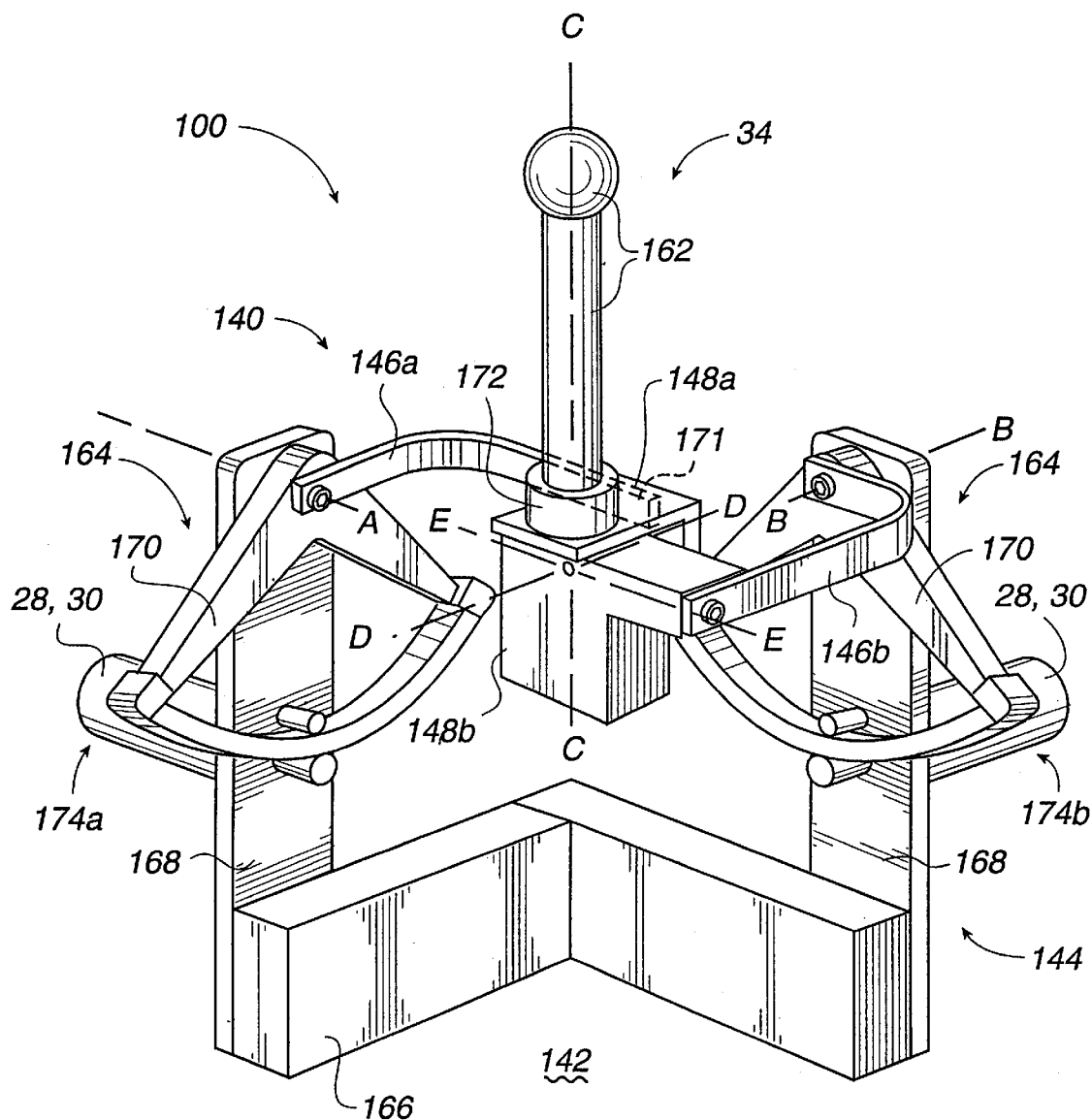
FIG. 3 is a perspective view of a second embodiment of a mechanism for interfacing a user manipulatable object with the force feedback device of FIG. 1.

FIG. 3 is a perspective view of another embodiment of a mechanical apparatus 100 suitable for providing mechanical input and output to host computer system 12. Apparatus 100 is more appropriate for a joystick or similar user object 34. Apparatus 100 includes gimbal mechanism 140, sensors 28 and actuators 30. User object 34 is shown in this embodiment as a joystick having a grip portion 162.

Gimbal mechanism 140 provides two rotary degrees of freedom to object 34. A gimbal device as shown in FIG. 3 is described in greater detail in co-pending patent applications Ser. No. 08/374,288 and 08/400,233, now U.S. Pat. Nos. 5,731,804 and 5,767,839 both hereby incorporated by reference in their entirety. Gimbal mechanism 140 provides support for apparatus 160 on grounded surface 142, such as a table top or similar surface. Gimbal mechanism 140 is a five-member linkage that includes a ground member 144, extension members 146a and 146b, and central members 148a and 148b. Gimbal mechanism 140 also includes capstan drive mechanisms 164.

Ground member 144 includes a base member 166 and vertical support members 168. Base member 166 is coupled to grounded surface 142. A vertical support member 168 is coupled to each of these outer surfaces of base member 166 such that vertical members 168 are in substantially 90-degree relation with each other. Ground member 144 is coupled to a base or surface which provides stability for mechanism 140. The members of gimbal mechanism 140 are rotatably coupled to one another through the use of bearings or pivots. Extension member 146a is rigidly coupled to a capstan drum 170 and is rotated about axis A as capstan drum 170 is rotated. Likewise, extension member 146b is rigidly coupled to the other capstan drum 170 and can be rotated about axis B. Central drive member 148a is rotatably coupled to extension member 146a and can rotate about floating axis D, and central link member 148b is rotatably coupled to an end of extension member 146b at a center point P and can rotate about floating axis E. Central drive member 148a and central link member 148b are rotatably coupled to each other at the center of rotation of the gimbal mechanism, which is the point of intersection P of axes A and B. Bearing 172 connects the two central members 148a and 148b together at the intersection point P.

Gimbal mechanism 140 is formed as a five member closed chain such that each end of one member is coupled to the end of a another member. Gimbal mechanism 140 provides two degrees of freedom to an object 34 positioned at or near to the center point P of rotation, where object 34 can be rotated about axis A and/or B. In alternate embodiments, object 34 can also be rotated or translated in other degrees of freedom, such as a linear degree of freedom along axis C or a rotary "spin" degree of freedom about axis C, and these additional degrees of freedom can be sensed and/or actuated. In addition, a capstan drive mechanism 164 can be coupled to each vertical member 168 to provide mechanical advantage without introducing friction and backlash to the system. Sensors 28 and actuators 30 can be coupled to gimbal mechanism 140 at the link points between members of the apparatus, and can be combined in the same housing of a grounded transducer 174a or 174b. A rotational shaft of actuator and sensor can be coupled to a pulley of capstan drive mechanism 164 to transmit input and output along the associated degree of freedom. User object 34 is shown as a joystick having a grip portion 162 for the user to grasp. A user can move the joystick about axes A and B.

Other embodiments of interface apparatuses and transducers can also be used in interface device 14 to provide mechanical input/output for user object 34. For example, interface apparatuses which provide one or more linear degrees of freedom to user object 34 can be used.

Figure 4:
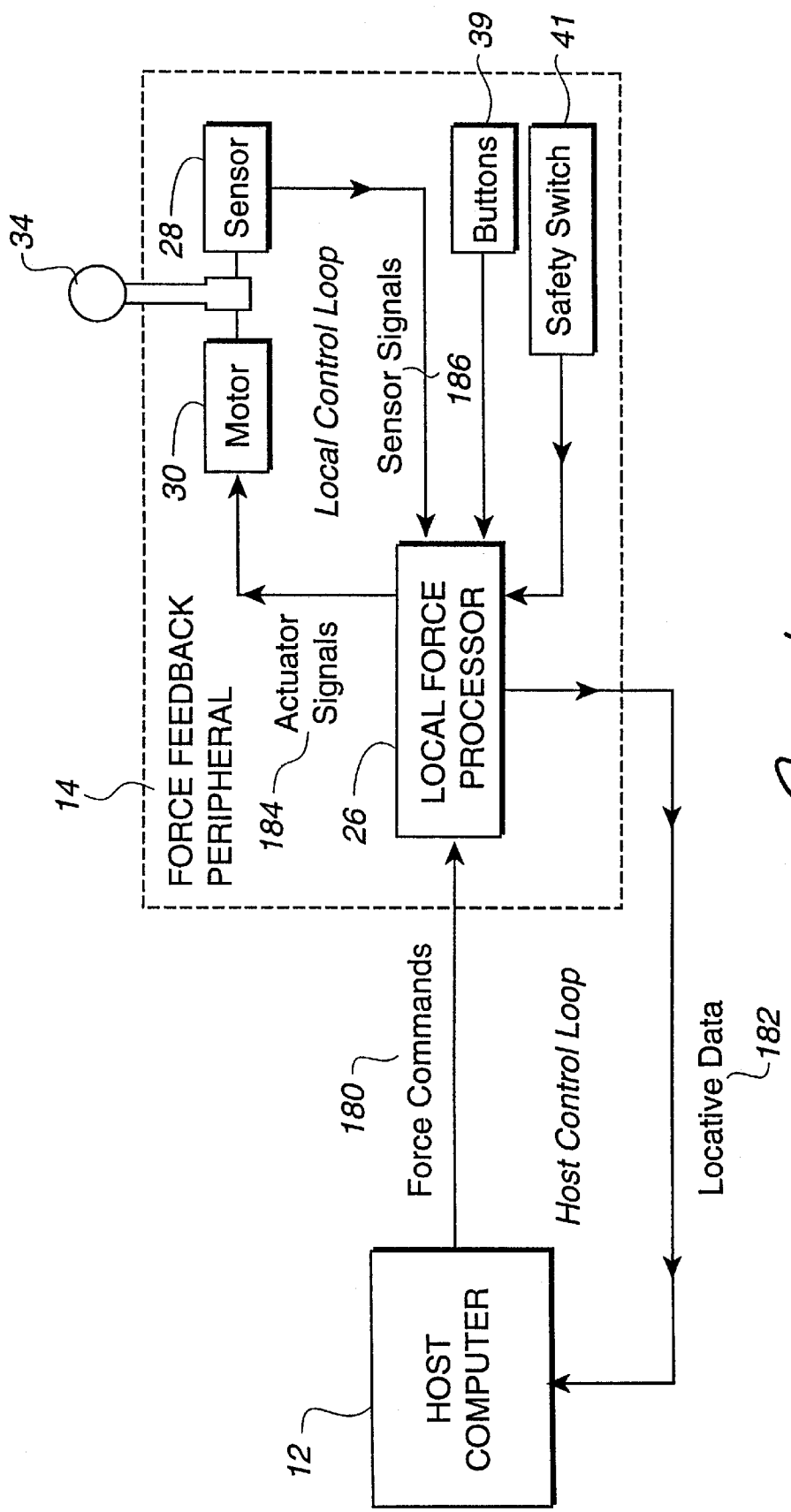
FIG. 4 is a block diagram illustrating a preferred functionality of the force feedback system of FIG. 1.

FIG. 4 is a block diagram illustrating the preferred functionality of the force feedback system 10 of FIG. 1. The force feedback system provides a host control loop of information and a local control loop of information in a distributed control system.

In the host control loop of information, force commands 180 are provided from the host computer to the microprocessor 26 and reported data 182 is provided from the microprocessor 26 to the host computer. In one direction of the host control loop, force commands 180 are output from the host computer to microprocessor 26 and instruct the microprocessor to output a force having specified characteristics. For example, in U.S. Pat. No. 5,734,373, a command protocol is disclosed in which a host command includes a command identifier, specifying the type of force, and one or more command parameters, specifying the characteristics of that type of force. The microprocessor decodes or parses the commands according to local software or firmware. The host computer can also provide other types of host commands to the microprocessor 26 to characterize reading data with sensors and reporting data.

In the other direction of the host control loop, the local microprocessor 26 receives the host commands 180 and reports data 182 to the host computer. This data 182 preferably includes locative data (or sensor data) that describes the position of the user object 34 in one or more provided degrees of freedom. In some embodiments, other locative data can also be reported to the host computer, including velocity and/or acceleration data of the user object 34 and data describing the states of buttons 39 and/or the states/ positions of other input devices 39 and safety switch 41. The host computer uses the data 182 to update programs executed by the host computer, such as a graphical simulation or environment, video game, graphical user interface, etc.

In the local control loop of information, actuator signals 184 are provided from the microprocessor 26 to actuators 30 and sensor signals 186 are provided from the sensors 28 and other input devices 39 to the microprocessor 26. The actuator signals 184 are provided from the microprocessor 26 to the actuators 30 to command the actuators to output a force or force sensation. The microprocessor can follow local program instructions (a "force routine") as described in greater detail in U.S. Pat. No. 5,734,373, incorporated by reference herein. Herein, the term "force sensation" refers to either a single force or a sequence of forces output by the actuators 30 which provide a sensation to the user. For example, vibrations, textures, attractive forces, a single jolt, or a force "groove" are all considered force sensations, as are the dynamic sensations disclosed herein.

In the other direction of the local control loop, the sensors 28 (and other input devices/safety switch) provide sensor signals 186 to the microprocessor 26 indicating a position (or other information) of the user object in degrees of freedom. The microprocessor may use the sensor signals in the local determination of forces to be output on the user object, as well as reporting locative data in data 182 derived from the sensor signals to the host computer that represents the position (or other characteristics) of the user object 34, as explained above. The data 182 reported to the host computer by the microprocessor 26 typically includes a direct representation of the position (or motion) of the user manipulatable object 34. The host computer updates an application program according to the newly-received position.

In a different, host-controlled embodiment that utilizes microprocessor 26, host computer 12 can provide low-level force commands over bus 24, which microprocessor 26 directly transmits to the actuators. In yet another alternate embodiment, no local microprocessor 26 is included in interface system 10, and host computer 12 directly controls and processes all signals to and from the interface device 14, e.g. the host computer directly controls the forces output by actuators 30 and directly receives sensor signals 186 from sensors 28 and input devices 39.

Force Feedback Sensations

Because force feedback devices can produce such a wide variety of feel sensations, each with its own unique parameters, constraints, and implementation issues, the overall spectrum of force sensations has been divided herein into subsets. Herein, three classes of feel sensations are discussed: spatial conditions ("conditions"), temporal effects ("effects" or "waves"), and dynamic sensations ("dynamics"). Conditions are force sensations that are a function of user motion, effects are force sensations that are a predefined profile played back over time, and dynamics are force sensations that are based on an interactive dynamic model of motion and time. These three types of force sensations are described in greater detail in parent application Ser. No. 08/846,011.

Conditions describe the basic physical properties of an interface device based on spatial motion of the interface. For example, a joystick device has basic properties such as the stiffness, damping, inertia, and friction in the joystick handle. These elementary conditions define the underlying feel of handle motion during general manipulation. Conditions can also be barriers or obstructions ("walls") that restrict spatial manipulation of the stick, and can also be textures. Conditions are very compelling physical sensations because they generate forces as a function of the spatial motion of the interface device as caused by the user. In most applications, conditions are used to tune the general feel of the device based upon provided parameters. For example, when flying an F-16 fighter in a game, a joystick handle might be made to feel very stiff and heavy. When flying an old Spitfire, a joystick handle might be made to feel loose and light. When the craft is damaged by an enemy fire, the joystick handle might be made to feel sticky with a scratchy texture.

Conditions are typically not associated with discrete sudden events during game play or application use, but are rather background conditions or background physical properties of application events, hence the name "conditions." A condition is usually an environmental feel that is set up and experienced over an extended period. Conditions may create force sensations that are a function of user object position, user velocity, and/or user object acceleration. Preferred standard types of conditions are springs, dampers, inertia, friction, texture, and walls. A spring force is a restoring force that feels like stretching or compressing a spring. A damper force is a drag resistance that feels like moving through a viscous liquid. An inertia force sensation feels as if the user is moving a heavy mass. A friction force sensation is a contact or rubbing resistance that encumbers free motion. A texture is a spatially varying resistance that feels like dragging a stick over a grating. A wall is an obstruction having a specified location that feels like a hard stop or a soft cushion.

Commanding conditions of the above types involves specifying the condition type and defining the unique physical properties associated with that type. Parameters can customize the feel of the force sensation by adjusting the location of the spring origin by assigning which axis or axes the spring is applied to, by limiting the maximum force output of the spring sensation, etc. Another parameter is a trigger parameter, which defines when to create the condition sensation. In the simplest case, the condition might be created (triggered) directly upon the call of the host command. In the more advanced case, the condition sensation being defined might be generated (triggered) upon a local event such as the press of a button. By defining these parameters, a wide variety of feels can be created. By combining multiple springs, even more diverse sensations can be defined. By combining one type of condition with other conditions such as textures and friction, the diversity grows further.

Effects are force sensations that are closely correlated with discrete temporal events during game play. For example, a shuttlecraft is blasted by an alien laser, the user feels a physical blast that is synchronized with graphics and sound that also represent the event. The jolt will likely have a predefined duration and possible have other parameters that describe the physical feel of the event. While discrete, effects can have a substantial duration—for example, if a small motor boat is caught in the wake of a huge tanker, the bobbing sensation may be an effect that lasts over an extended period and may vary over time. Effects are best thought of as predefined functions of time such as vibrations and jolts that can be "overlaid" on top of the background conditions described above as foreground sensations. In other words, effects are forces that are defined and "played back" over time when called.

Effects fall into two classes as described herein: a) Force Signals and b) Force Profiles. A Force Signal is an effect that is defined based on a mathematical relationship between force and time. This mathematical relationship is defined using waveform conventions. For example, a Force Signal might be defined as a force that varies with time based on a sine-wave of a given frequency and magnitude to create a vibration sensation. A Force Profile is an Effect that is defined based on a stream of digitized data. This is simply a list of force samples that are stored and played back over time. Using Force Signals, a complex sensation can be defined based on simple parameters such as Sine-Wave, 50 Hz, 50% magnitude. An advantage of Force Profiles is that they allow for more general shapes of forces, but require a significant amount of data to be transferred to and stored at the interface device 14. A convenient way of defining force effects is by common wave parameters such as source, magnitude, period, duration, offset, and phase. Once a waveform is defined, its shape can be adjusted using an envelope whose shape is defined by further parameters such as Impulse Level and Settle Time, Fade Level and Fade Time. Further parameters can specify direction in vector space, degrees of freedom, and triggers (buttons). Furthermore, a single complex effect can be specified as a sequential combination of multiple simpler effects.

Three basic types of effects are periodic, constant force (vector force), and ramp. The periodic type of effect is the basic effect described above, in which a signal source such as a sine wave, triangle wave, square wave, etc., has a frequency and amplitude and may be shaped for a specific application. A vibration is the most common type of periodic force. A constant force is simply a constant magnitude output over time, but also may be shaped using the envelope parameters discussed above to achieve a waveform that is shaped like the envelope. A ramp is simply a rising force magnitude followed by a falling force magnitude, and can be defined as a single half cycle of a triangle wave or other waveform. Other types, such as periodic sweep, vector force, pop, and smart pop, can also be defined, as disclosed in parent application 08/846,011.

Dynamic force sensations provide interactive force sensations based on real-time dynamic simulations of physical systems. Dynamic sensations involve real-time physical interactions based on 1) user motion as well as 2) a physical system wherein user motion during the interaction affects the behavior of the physical system. For example, if the user wades through swamp-muck in a violent manner that stirs up undulations in the fluid, the user's rash motions will increase the difficulty of travel because the undulations in the fluid will worsen as the user struggles. But, if the user wades through the swamp-muck in a dexterous manner that absorbs the undulations in the fluid, the user will have an easier time passing through the muck. This example, like all interactions with physical systems, demonstrates that how the user influences the system during the event will effect how the event feels.

High level dynamic sensation commands allow the host computer to coordinate the feel and execution of the dynamic sensations with gaming or other application program interactions. Each dynamic sensation sets up a physical sensation within the local processing routine of the interface device. Parameters defined by the programmer can tune the dynamic sensation for specific application events. Basic types of dynamic sensations include Dynamic Control Law, Dynamic Recoil, Dynamic Impact, Dynamic Liquid. Dynamic Inertia, Dynamic Center Drift, Dynamic Sling and Dynamic Paddle. Preferably, each of these sensations is based on a basic physical system defined in Dynamic Control Law including a dynamic mass that is connected to the user object 34 by a simulated spring and a simulated damper. When the user object 34 moves, the simulated mass moves because the spring and the damper link the two systems "physically." Depending upon how the mass, the spring, and the damper parameters are defined, the mass might jiggle, jerk, or sluggishly lag behind the user object. Also, there are initial conditions that can be defined to help tune the feel sensation, and an ambient damping parameter that defines the simulated medium that the mass is moving in. The user feels the effects of the physical system and may influence the physical system dynamically. These parameters can be varied to provide the variety of dynamic sensations.

Figure 5:
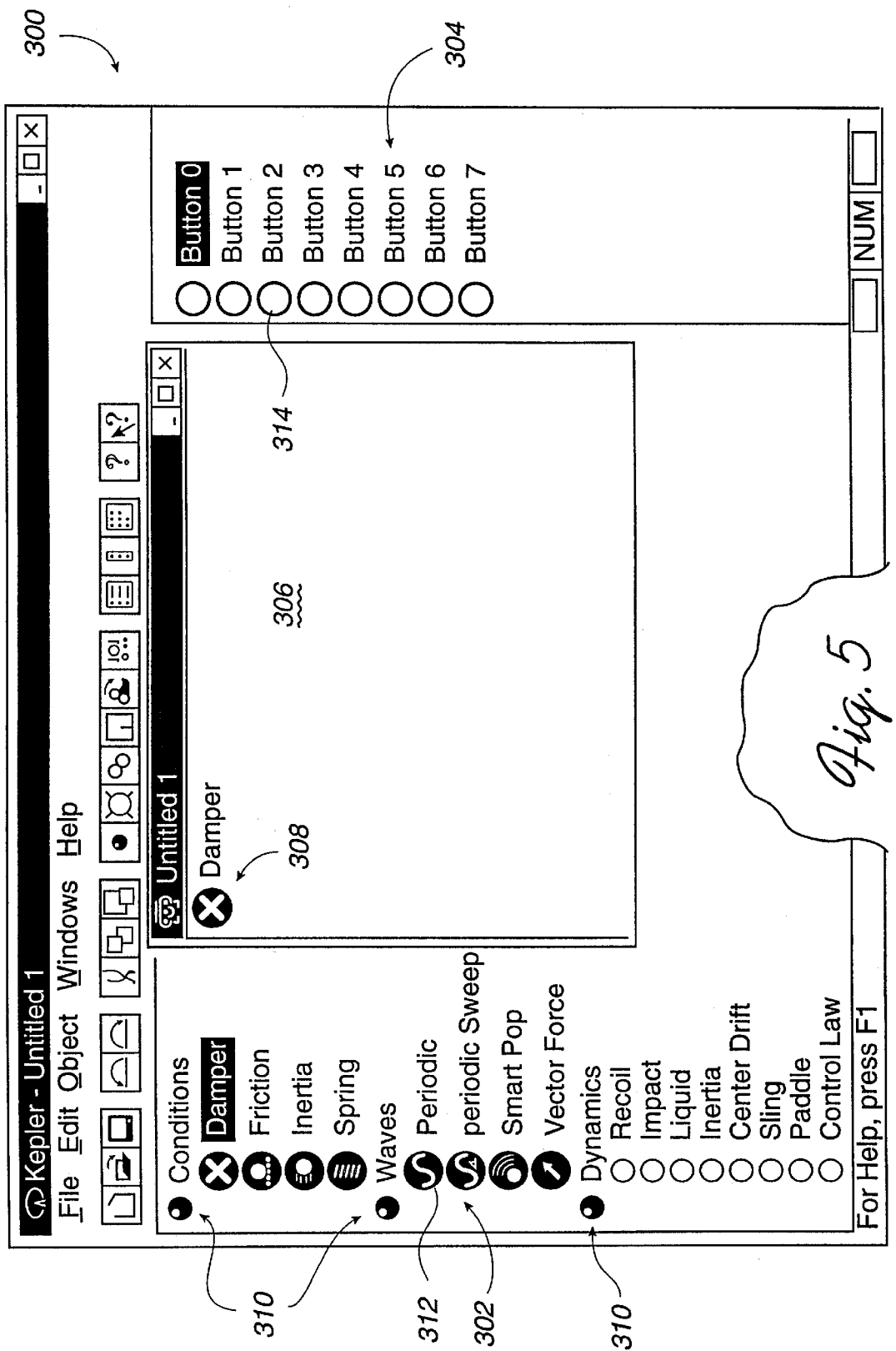
FIG. 5 is a diagram of a displayed interface of the present invention for designing force sensations.

FIG. 5 illustrates a display device 20 displaying an interactive graphical toolset interface 300 of the present invention that enables developers and programmers of force feedback ("users" of the interface) to design and implement force sensations rapidly and efficiently. The graphical environment allows conditions, effects ("waves"), and dynamics to be defined through intuitive graphical metaphors that convey the physical meaning of each parameter involved. As the parameters are manipulated, sensations can be felt in real-time, allowing for an iterative design process that fine-tunes the feel to the designer's exact need. Once the appropriate sensation is achieved, the interface can save the parameters as a resource and automatically generate optimized code in a desired format that can be used directly within an application program. Thus, interface 300 handles most of the force feedback development process from force sensation design to coding. With these tools, force feedback programming becomes a fast and simple process.

The challenge of programming for force feedback is not the act of coding. Force models to provide force sensations are available, and, once the desired force sensation is known and characterized, it is straightforward to implement the force sensation using software instructions. However, the act of designing force sensations to provide a desired feel that appropriately match gaming or other application events is not so straightforward. Designing force sensations and a particular feel requires a creative and interactive process where parameters are defined, their effect experienced, and the parameters are modified until the sensations are at the desired characterization. For example, when designing conditions, this interactive process might involve setting the stiffness of springs, sizing the deadband, manipulating the offset, and tuning the saturation values. When designing effects, this might involve selecting a wave source (sine, square, triangle, etc.), setting the magnitude, frequency, and duration of the signal, and then tuning the envelope parameters. For a dynamic sensation, this might involve setting the dynamic mass, and then tuning resonance and decay parameters. With so many parameters to choose from, each applicable to a different type of force sensation, there needs to be a fast, simple, and interactive means for sensation design. To solve this need, the graphical interface 300 of the present invention allows a user to rapidly set physical parameters and feel sensations, after which the interface automatically generates the appropriate code for use in a host computer application program.

Interface 300 enables interactive real-time sensation design of conditions, effects, and dynamics, where parameters can be defined and experienced through a rapid iterative process. Thus, it is preferred that a force feedback interface device 14 be connected to the computer implementing interface 300 and be operative to output commanded force sensations. Intuitive graphical metaphors that enhance a programmer's understanding of the physical parameters related to each sensation type are provided in interface 300, thereby speeding the iterative design process. File-management tools are also preferably provided in interface 300 so that designed force sensations can be saved, copied, modified, and combined, thereby allowing a user to establish a library of force sensations. Once sensations are defined, the interface 300 preferably stores the parameters as "resources" which can be used by an application program. For example, by linking a force sensation resource into an application program, the resources can be converted into optimized Direct-X code for use in an application in the Windows environment. Other code formats or languages can be provided in other embodiments. Interface 300 can be implemented by program instructions or code stored on a computer readable medium, where the computer readable medium can be either a portable or immobile item and may be semiconductor or other memory of the executing computer (such as computer 12), magnetic hard disk or tape, portable disk, optical media such as CD-ROM, PCMCIA card, or other medium.

As shown in FIG. 5, the interface 300 has three primary work areas: the sensation pallet 302, the button trigger pallet 304, and the design space 306. Force sensations are created in the design space 306 and can be saved and loaded into that space using standard file handling features.

To create a new force sensation, a sensation type is chosen from the sensation pallet 302. Pallet 302 is shown in an expandable tree format. The root of the tree includes the three classes 310 of force feedback sensations described herein, conditions, waves (effects), and dynamics. Preferably, users can also define their own headings; for example, a "Favorites" group can be added, where force sensations with desirable previously-designed parameters are stored.

In interface 300, the conditions, waves, and dynamics classes are shown in expanded view. These classes may also be "compressed" so as to only display the class heading, if desired. When a class is displayed in expanded view, the interface 300 displays a listing of all the sensation types that are supported by the hardware connected to the host computer 12 for that class. For example, when programming for more recent or expensive hardware supporting a large number of force sensation types, a list including many or all available sensation types is displayed. When programming for older or less expensive interface device hardware that may not implement all the sensations, some sensation types can be omitted or unavailable to be selected in the expanded view. Preferably, interface 300 can determine exactly what force sensations are supported by a given interface device 14 connected to the host computer by using an effect enumeration process, i.e., the host computer can request information from the interface device, such as a version number, date of manufacture, list of implemented features, etc.

Once a sensation type is chosen from the sensation pallet 302, the sensation type is added to the design space 306. For example, in FIG. 5, an icon 308 for the selected force sensation "Damper" is displayed within the design space 306 window. Icon 308 can now be selected/opened by the user in order to set the parameters for the given sensation type using graphical development tools (described below). Multiple icons can similarly be dragged to the design space to create a more complex force sensation. Once the parameters are specified for the given sensation, the sensation can be saved as a resource file. Using this process, a user can create a diverse library of feel sensations as resource files. Also, predefined libraries of sample resources from third party sources might also be available.

Options displayed in the trigger button pallet 304 can also be selected by the user. Trigger pallet 304 is used for testing force sensations that are going to be defined as button reflexes. For example, a force sensation might be designed as a combination of a square wave and a sine wave that triggers when Button #2 of the interface device is pressed. The square wave would be created by choosing the periodic type 312 from the sensation pallet 302 and defining parameters appropriate for the square wave. A sine wave would then be created by choosing another periodic type 312 from the sensation pallet 302 and defining the parameters appropriate for the sine wave. At this point, two periodic icons 308 would be displayed in the design space window 306. To test the trigger, the user can just drag and drop these icons 308 into the Button 2 icon 314. Button 2 on the interface device 14 has thus been designed to trigger the reflex sensation when pressed. This process is fast, simple, and versatile. When the user achieves a sensation exactly as desired, the sensation can be saved as a resource file and optimized software code for use in the application program is generated. The Button 2 selection might be provided in other ways in different embodiments. For example, the user might select or highlight the designed force icons in design space 306 and then select the Button 2 icon in pallet 304 to indicate that the highlighted forces will be triggered by Button 2.

Figure 6:
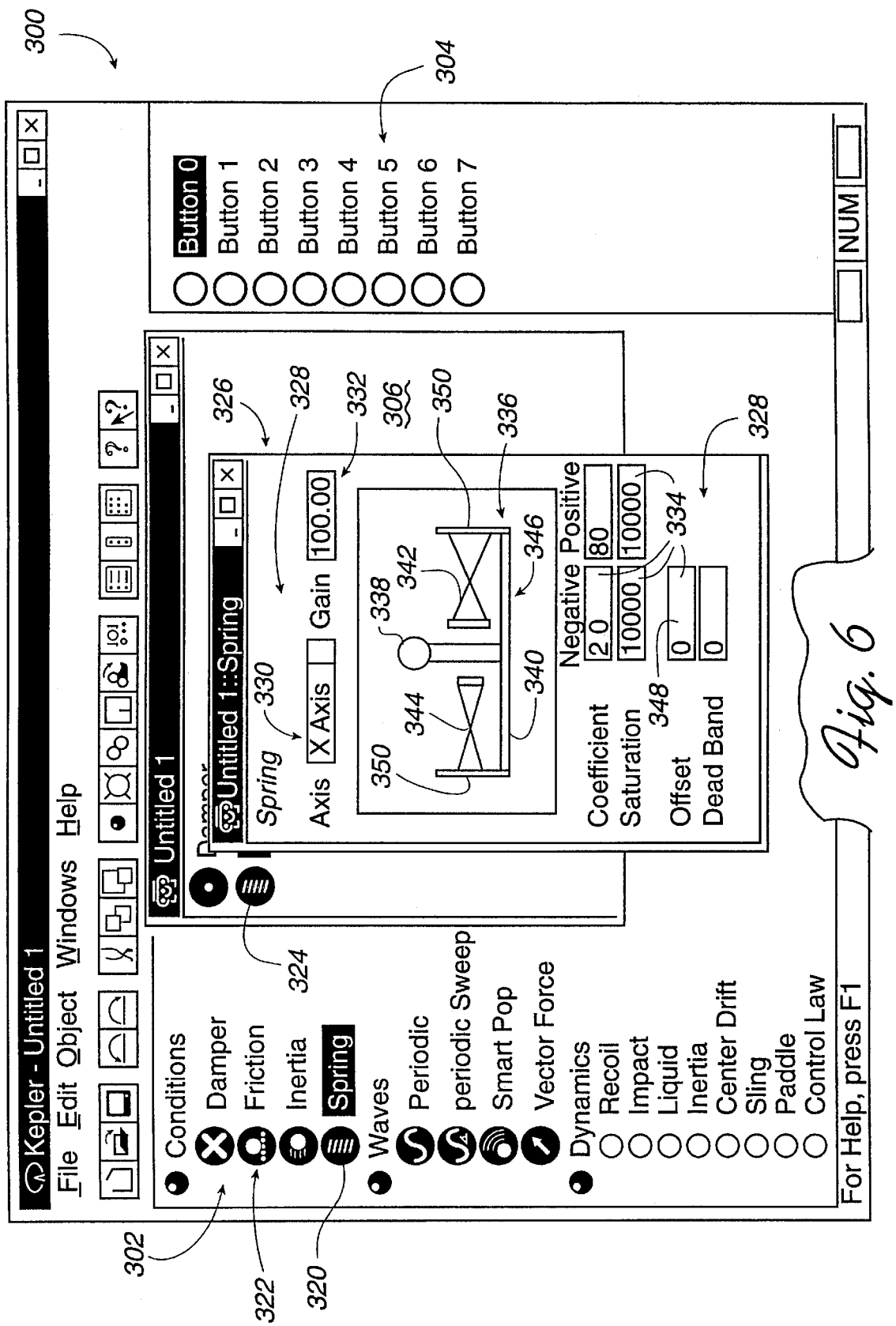
FIG. 6 is a diagram of the interface of FIG. 5 in which a design window for a spring condition is displayed.

FIG. 6 illustrates interface 300 where a force sensation is characterized in the design space 306. When an icon 308 in design space 306 is selected by the user, the icon 308 expands into a force sensation window and graphical environment for setting and testing the physical parameters associated with the selected sensation. For example, in FIG. 6, a spring sensation type 320 has been selected from the condition list 322 and provided as icon 324 in the design space 306. A spring window 326 is displayed in design space 306 when icon 324 is selected. Within spring window 326 are fields 328 characterizing the force, including the axis 330 (and/or direction, degree of freedom, etc.) in which the force is to be applied, the gain 332 (or magnitude) of the force, and the parameters 334 associated with the force sensation. For example, for the spring sensation, the positive stiffness ("coefficient"), negative stiffness ("coefficient"), positive saturation, negative saturation, offset, and deadband of the spring sensation are displayed as parameters. The user can input desired data into the fields 328 to characterize the force. For example, the user has specified that the force is to be applied along the x-axis (in both directions, since no single direction is specified, has specified a gain of 100, and has specified saturation values of 10,000 in positive and negative directions. The user can also preferably specify all or some of the parameters in graphical fashion by adjusting the size or shape of the envelope, the height or frequency of the waveform, the width of the deadband or springs, the location of a wall on an axis, etc. by using a cursor or other controlled graphical object.

As the user inputs values into fields 328, the resulting additions and changes to the force sensation are displayed in an intuitive graphical format in the force sensation window. For example, in the spring sensation window 326, graphical representation 336 is displayed. Representation 336 includes an image 338 of the user object 34 (shown as a joystick, but which also can be shown as other types of user objects), an image 340 of ground, an image 342 of a spring on the right of the joystick 34, and an image 344 of a spring on the left of the joystick 34. Representation 336 models a single axis or degree of freedom of the interface device.

Representation 336 represents a physical, graphical model with which the user can visually understand the functioning of the force sensation. The user object image 338 is displayed preferably having a shape similar to the actual user object of the desired interface device (a joystick in this example). Along the displayed axis, in both directions, there are spring images 342 and 344 as defined by a positive stiffness parameter (k) and a negative stiffness parameter (k). Graphically, the large stiffness of the spring to the right (coefficient of 80) is represented as a larger spring image 342. The origin of the spring condition is shown at a center position 346, since the offset parameter 348 is zero. If the offset has a positive or negative magnitude, the origin would be displayed accordingly toward the left or right. The deadband region is shown graphically as the gap between the user object image 338 and the spring images 342 and 344.

In the preferred embodiment, the graphical representation further helps the user visualize the designed force sensation by being updated in real time in accordance with the movement of the user object 34 of the connected interface device 14. User object image 338 will move in a direction corresponding to the movement of user object 34 as caused by the user. The user object is free to be moved in either the positive or negative direction along the given axis and encounter either a positive or negative stiffness from the spring sensation. Thus, if the user object is freely moved to the left from origin 346, the joystick image 338 is moved left in the deadband region, and when the user object 34 encounters the spring resistance, the joystick image 338 is displayed contacting the spring image 344. If there is no deadband defined, the spring images 342 and 344 are displayed as contacting the joystick image 338 at the center position. The edge stop images 350 define the limits to the degree of freedom; for example, when the user object 34 is moved to a physical limit of the interface device along an axis, the joystick image 338 is displayed as contacting an appropriate edge stop image 350.

Figure 7A:
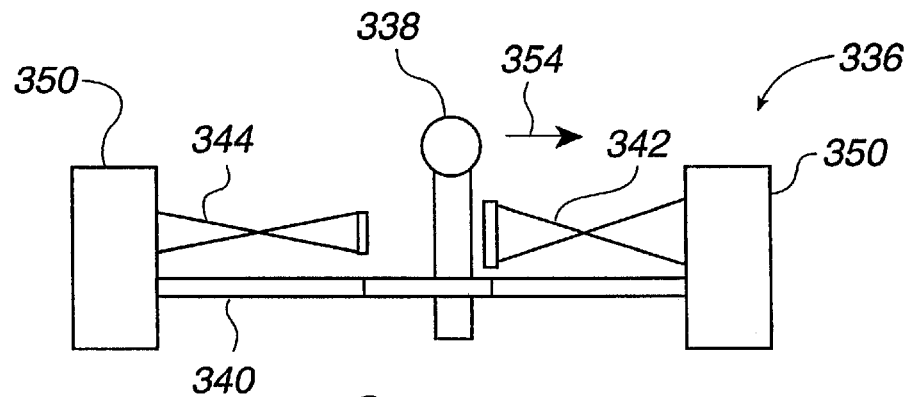
FIGS. 7a–c are diagrams of displayed graphical representations of a spring condition.
Figure 7B:
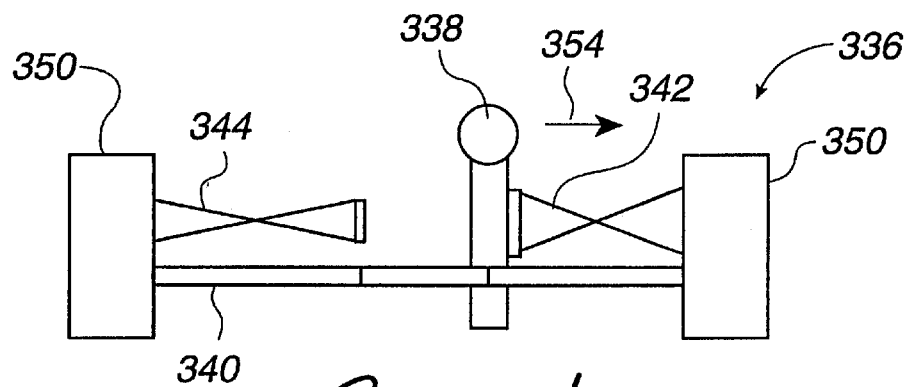
Figure 7C:
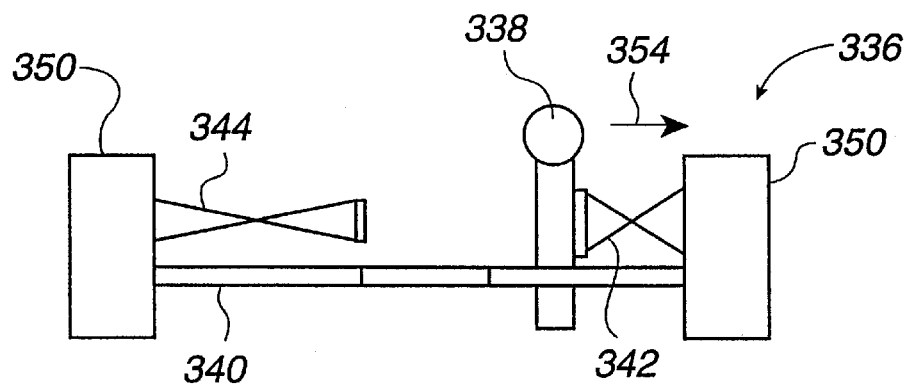

FIGS. 7a–7c illustrate graphical representation 336 as the user object 34 is moved by the user. In FIG. 7a, the user moves the user object 34 and image 338 in a positive direction along an axis as shown by arrow 354. No force resistance is felt by the user, since the user object is in the deadband region. This is represented by displaying joystick image 338 having no contact with other objects. In FIG. 7b, the user object 34 encounters spring stiffness in the positive direction and begins to compress the spring. As shown by the graphical representation 336, the joystick image 338 has contacted right spring image 342 and the spring image 342 is shown slightly compressed. In FIG. 7c, the user object continues to move against the spring force, as accordingly displayed as spring 342 compression in representation 336. Once the positive spring stiffness is encountered, the resistance force increases linearly with compression of the spring (as is true of a real spring). The amount of compression felt by the user is correlated with the amount of compression shown by spring image 342. If the programmer has defined a saturation value for force opposing movement in the positive direction, the force output would cease increasing with compression once the saturation limit in the positive direction was exceeded. The saturation can also be shown graphically, for example by displaying the applicable spring image in a different color (such as red), or by displaying a message or indicator on the screen.

Referring to FIG. 6, once the user has tested the input parameters and settings, he or she may change any of the existing information or add new information by inputting data into fields 328. Any such changes will instantly be displayed in window 326. For example, if the user changes the coefficient (stiffness) of the spring on the right, the spring image 342 will immediately be changed in size to correlate with the new value. The user thus gains an intuitive sense of how the sensation will feel by simply viewing the representation 336. The user can then determine how the sensation will feel with more accuracy (fine tuning) by moving the user object and feeling the sensation. Thus, the graphical representation 336 as displayed clearly demonstrates to the user the various effects of parameters on the force sensation and additionally allows the user to experience the forces coordinated with the graphical representation.

Figure 8:
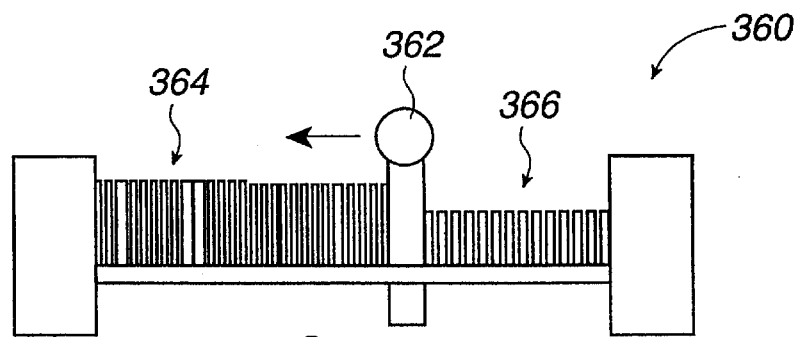
FIG. 8 is a diagram of a displayed graphical representation of a texture condition.

FIG. 8 illustrates another graphical representation 360 that can be displayed in interface 300 for a spatial texture condition. Joystick image 362 is moved in coordination with movement of the user object 34, as described above. A spatial texture is graphically designated in the displayed axis by left grating 364 and right grating 366, which represent "bumps" in the texture. Left grating 364 has a different size of "bump" and a different spacing between bumps than right grating 366. The appropriate texture is felt by the user on user object 34 and visualized on representation 360 as the user object is moved through the textured region. The user preferably can specify the space between bumps, the size of the bumps, the magnitude of the bumps (shown by the height of the grating in representation 360), and the overall size of a textured region in an axis. Each axis can preferably be separately characterized with textures. An alternative graphical representation of a texture condition is described with reference to FIG. 24.

Figure 9A:
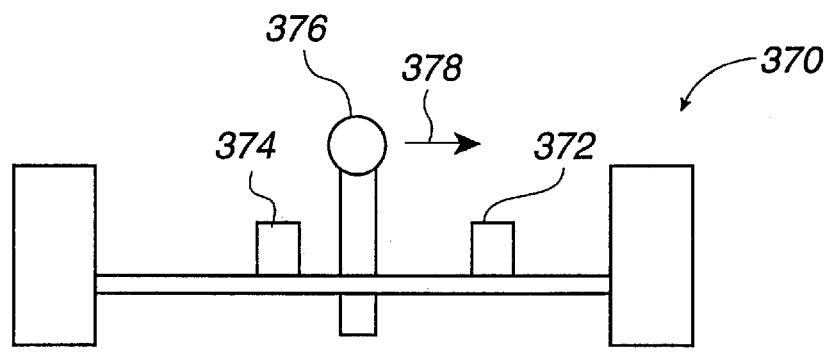
FIGS. 9a and 9b are displayed graphical representations of a wall condition.
Figure 9B:
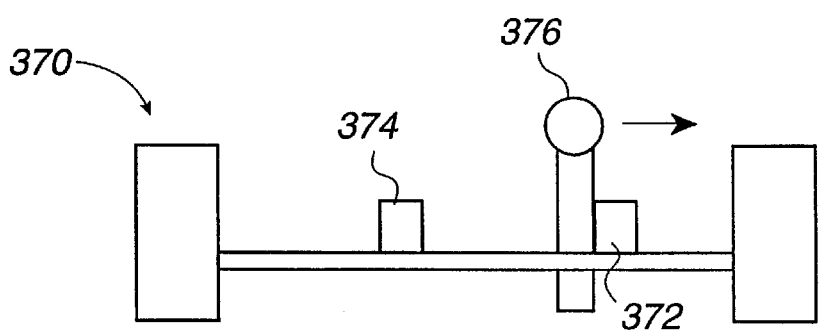

FIG. 9a illustrates a graphical representation 370 that can be displayed in interface 300 for a wall condition. Hard-stop images 372 and/or 374 can be provided in the path of travel of the joystick image 376. As shown in FIG. 9b, when the user object is moved to encounter the wall force, the joystick image 376 is correspondingly moved as shown by arrow 378 against the stop image 372. The user can specify the location of the wall, the hardness of the wall, and other parameters as discussed above for a wall condition. For example, if the user specifies the wall as having a hard like metal material, the image of the joystick 376 will not tend to bend or compress the stop image 372. However, if the wall is specified as a flexible, rubber-like material, the joystick 376 can be displayed moving into the stop image 372 or the stop image can be displayed as "compressing" or shrinking as the wall "flexes" in response to the user object moving into it.

Other condition force sensations may also be similarly graphically represented in design space 306. For example, a damping condition can be displayed similarly to the spring condition, where a schematic representation of a damper is displayed in each direction on an axis. Another alternative damper representation is shown with respect to FIG. 12. An inertia condition can be represented using a graphical image of a mass on top of or connected to the joystick image 338, where the size of the image indicates the size of the mass. A friction condition can be represented by a texture having bumps or the like, or by a region having a specific color or shade.

In other embodiments, a 2 dimensional force sensation (i.e. two degrees of freedom) can be displayed in the window 326 by showing an overhead representation of the user object. For example, a circular user object image can be displayed in the middle of two sets of spring images in a cross formation, each set of springs for a different degree of freedom.

Figure 10:
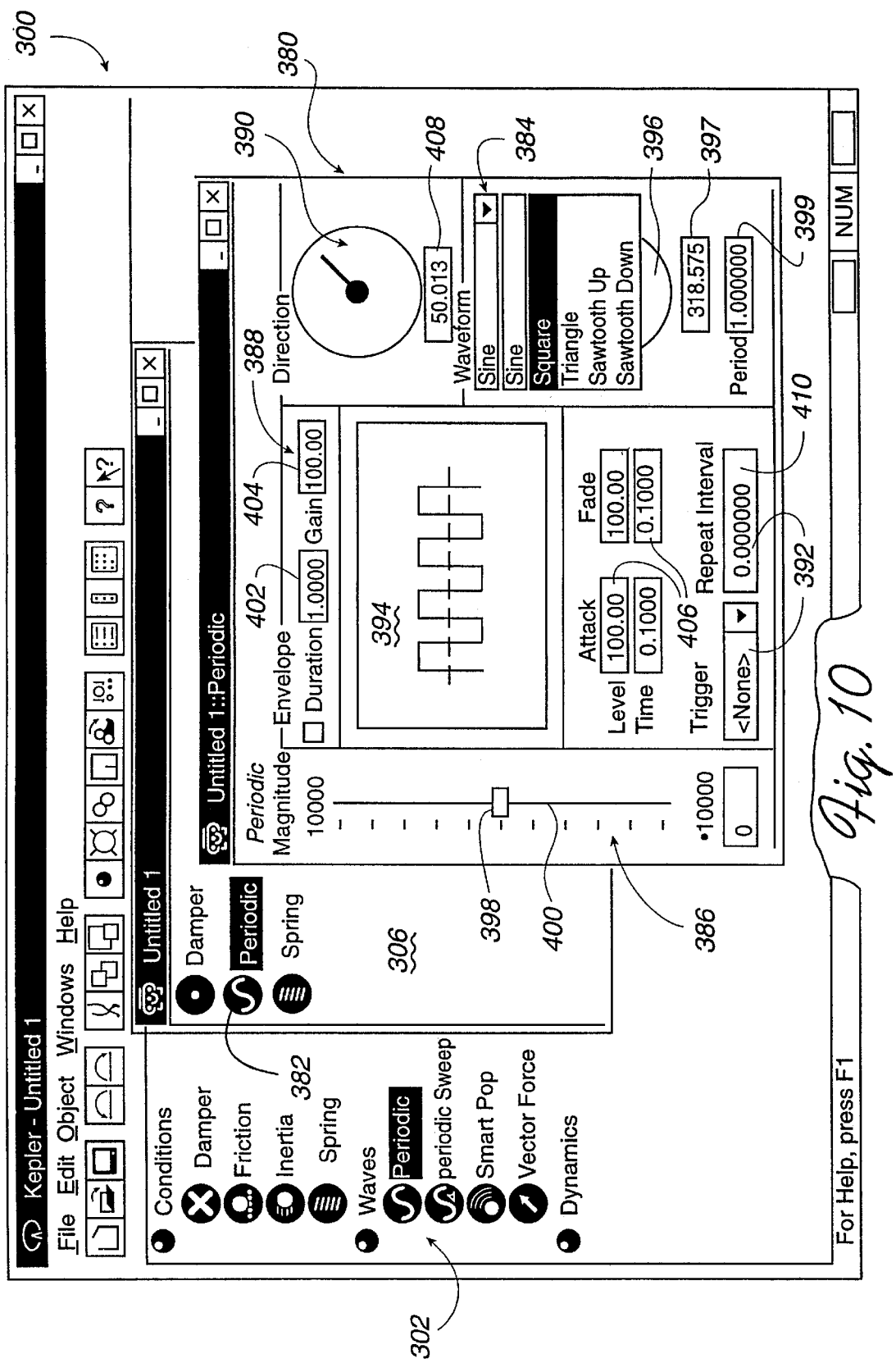
FIG. 10 is a diagram of the interface of FIG. 5 in which a design window for a periodic effect is displayed.

FIG. 10 illustrates interface 300 with a graphical representation for a periodic wave (effect) sensation. Periodic window 380 is displayed in response to the user selecting (e.g., double clicking on) periodic icon 382 that has been dragged into design space 306. The periodic window 380 includes a waveform source field 384, magnitude scale 386, envelope parameters 388, direction dial 390, trigger parameters 392, and a graphical representation 392. Waveform source field 384 allows a user to select from multiple available types of signal wave sources for the effect. In the case of FIG. 10, the user has selected a square wave source. Graphical representation 394 is displayed having a shape based on the wave source chosen. Thus, a square wave is graphically displayed in the example of FIG. 10. The direction of the waveform may also be selected using dial 396 (which is partially obscured by the wave source drop-down menu) and field 397. A period 399 may also be input to specify the frequency of the waveform.

The magnitude scale 386 can be adjusted by the user to select a magnitude of the wave shown by graphical representation 394. In the preferred embodiment, the scale is a slider control knob 398 that can be moved by the user along the scale 400, where the scale 400 is preferably arranged in a vertical orientation corresponding to the magnitude scale of graphical representation 394 to permit greater ease of visualization on the part of the user. In other embodiments, other magnitude selection fields or objects may be provided.

Envelope parameters 388 allow the user to shape the waveform into a desired effect. For example, parameters 388 preferably include a duration field 402, a gain field 404 (where "gain" can be used as a global scaling factor or multiplier for force magnitudes output by the interface device 14), and attack and fade parameters 406 to permit the specifying of impulse magnitude and fade rate. Direction dial 390 is a graphical object allowing a user to specify the direction of the effect in two dimensions. The user may drag or otherwise specify the angle of the pointer, which is also shown in direction field 408 (dial 396 is preferably similar). Trigger parameters 392 allow a user to assign trigger button (s) to the designed effect. The repeat interval field 410 allows a user to specify the amount of time before the effect is repeated if the designated button is held down. These parameters and characteristics can be entered as numbers in the displayed input fields or prompts, or can be input by dragging the graphical representation 394 of the waveform with a cursor to the desired shape or level.

The parameters, when specified, cause the graphical representation 394 to change according to the parameters. Thus, if the user specifies a particular envelope, that envelope is immediately displayed in the window 380. The user can thus quickly visually determine how specified parameters exactly affect the periodic waveform. The user can also activate the waveform sensation and grasp the user object to experience the actual force sensation. Preferably, the graphical representation 380 is animated or a pointer is moved in coordination with the output of the force sensation on the user object. For example, if an impulse and fade is specified, the wave is animated so that the impulse portion of the waveform is displayed when the impulse force is output on the user object, and the fade is displayed when the output force fades down to a steady state level. Alternatively, the entire waveform can be displayed, and a pointer or other marker can designate which portion of the waveform is currently being output as a force on the user object. This feature enables the user to realize how different portions of the wave affect the feel sensation on the user object.

Figure 11:
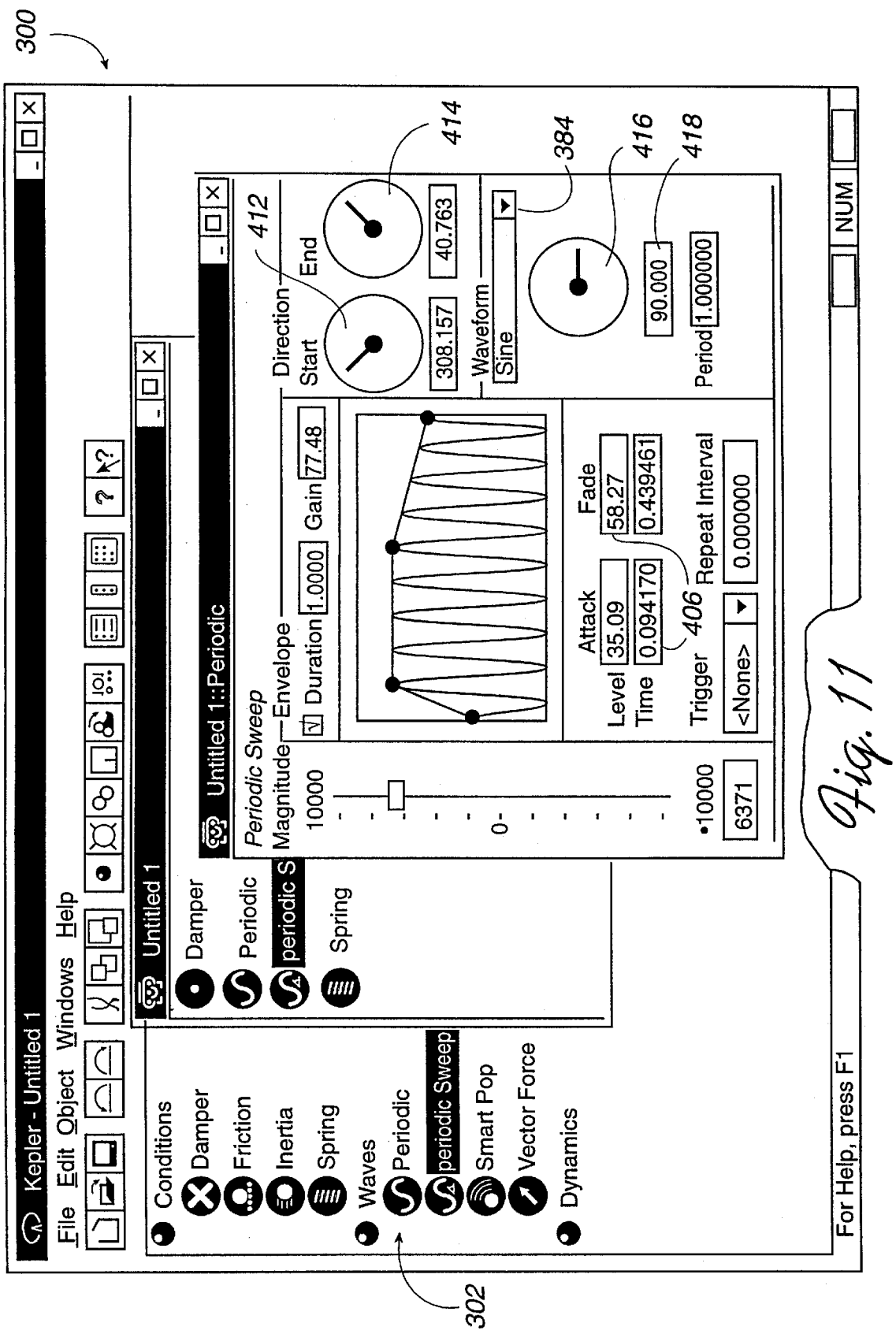
FIG. 11 is a diagram of the interface of FIG. 5 in which a design window for a periodic sweep effect is displayed.

FIG. 11 illustrates interface 300 displaying a graphical representation of an advanced periodic sweep sensation. This type of waveform may include additional variables and features over the standard waveform effect described with reference to FIG. 10. A periodic sweep sensation is similar to a standard periodic waveform or vibration, but is different in that the direction of the force sweeps between a start and end orientation or direction. A start dial 412 and an end dial 414 are used by the user to define the starting and ending directions for the periodic sweep. In example of FIG. 11, the user has chosen a sine wave as the signal source in field 384.

The user also has assigned values to the magnitude, period, and of the signal, similar to the waveform of FIG. 10. The user has also activated the envelope feature and has created an impulse wave shape using attack and fade parameters 406. In addition, the user can assign a phase using a phase pointer 416 and phase field 418, which indicate the phase angle of the waveform. These parameters and characteristics can be entered as numbers in an input field or prompt, or can be input by dragging the graphical outline of the waveform with a cursor to the desired shape or level. When the user wishes to test the force sensation, the user can feel the direction of the force sweep through the directions as specified in the dials 412 and 414 and can thus easily determine the correlation of the dials and the desired feel sensation.

Other waves that can be designed and tested in the interface 300 include a "smart pop" and a vector force. For example, a Vector force can be designed using a window similar to window 380, where the direction of the force is selected with dial 390. An envelope could also be specified for the vector force, if desired, using window 390 and displayed therein.

Dynamic force sensations, when selected in design space 306, are similarly displayed in a sensation window and provide parameter fields into which the user may enter parameter data. A visual representation can be displayed as the simulated physical system described above. For example, the Dynamic Control Law sensation has parameters that directly affect the components of the displayed physical system and can be readily viewed and tested by the user. For the other dynamic sensations, the user can be shown the mapping of the parameters of the selected dynamic sensation to the dynamic control law parameters so the user can view how the parameters effect the simulated physical system. In other embodiments, a more appropriate representation might be displayed instead of or in addition to the physical system described above. For example, for the sling and paddle sensations, a representation of the ball and sling can be displayed. For Dynamic Liquid, the user object can be displayed in the middle of animated liquid which undulates in conjunction with the movement of a simulated mass. For Dynamic Recoil, a picture of a gun or weapon can move in conjunction with the blast and reverberation of the sensation. Other animations and representations can be provided as desired.

Once a force sensation has been designed using the graphical tools as described above, the definition can be saved as a resource of parameters. By accessing the interface resource from an application program, the resource is converted automatically from a parameter set to code in the desired language or format, e.g., Direct-X by Microsoft® Corporation for use in the Windows™ operating system. For example, the force feedback resource can be provided as or in a DLL (Dynamic Linked Library) that is linked to an application program. In one embodiment, the DLL can provide the application program with effects defined as completed Direct_X Structs (DI_Struct), where the application programmer can then create effects by using the CreateEffect call within Direct-X (or equivalent calls in other languages/formats). Or, the DLL can perform the entire process and create the effect for the application program, providing the programmer with a pointer to the sensation. One advantage of using the first option of having the programmer call CreateEffect is that it gives the programmer the opportunity to access the parameters before creating the effect so that the parameters can be modified, if desired.

Figure 12:
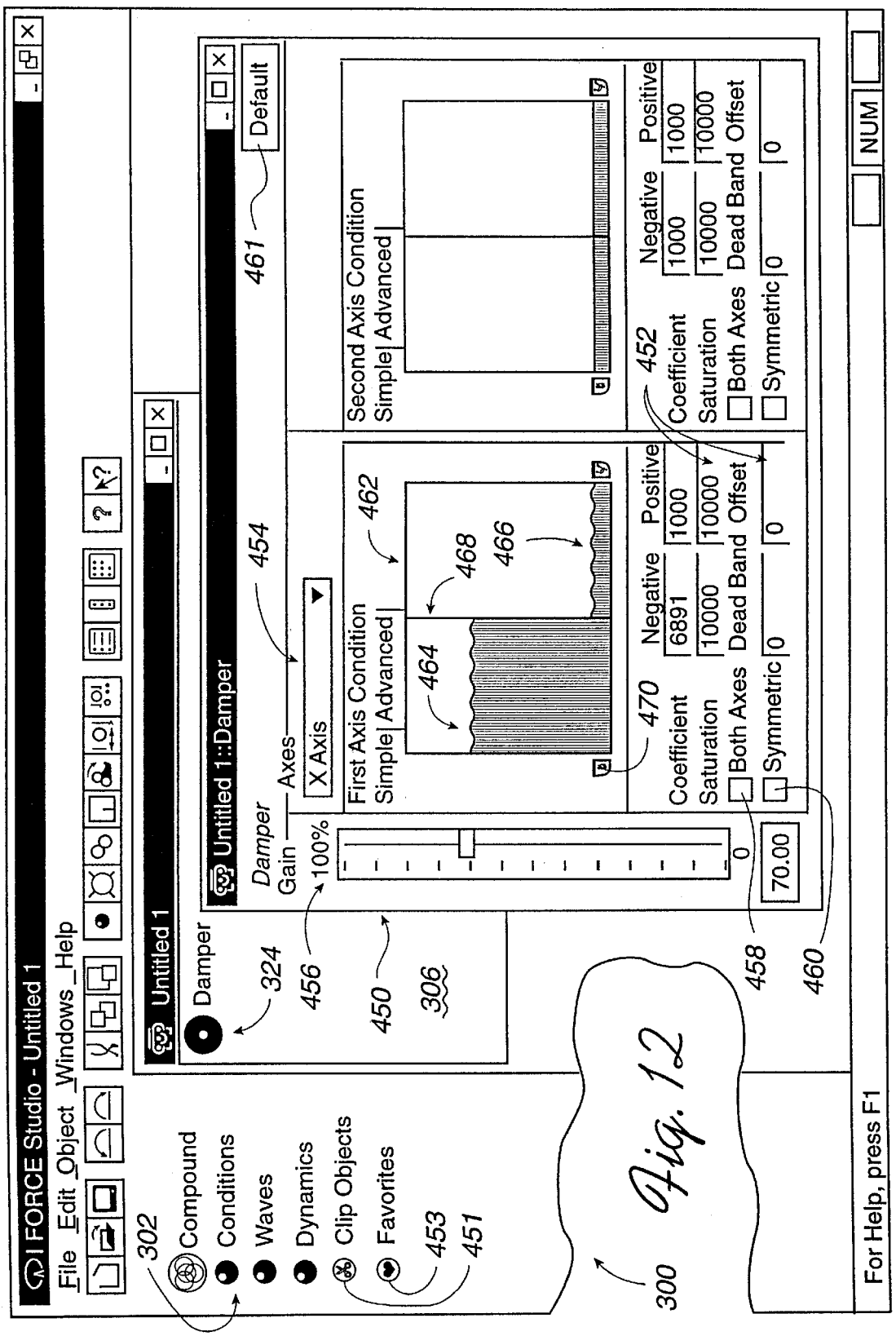
FIGS. 12–13 are diagrams of the interface of FIG. 5 in which a simple mode design window for a damping condition is displayed.

FIG. 12 illustrates interface 300 displaying a graphical representation of a damping condition (damper) in design space 306. The user has dragged a damper icon 324 into the design space 306. A damper window 450 is displayed in design space 306 when damper icon 324 is selected. Within damper window 450 are two main windows, one for each axis (assuming two axis interface device). The second axis has not been specified in the example of FIG. 12. Within the first axis window are fields 452 characterizing the damping force, similar to fields 328 in spring window 326 of FIG. 6. The axis or axes in which the force is applied is selected in field 454. If both axes are selected, then a window for each axis is displayed and includes a graphical representation of the force sensation. The user can select a global force gain using slider 456. A defaults button 461 can be selected by the user to return all parameter values to default levels (preferably, the user can save preferred default levels if desired). The user can also select both-axes box 458, which causes the parameters of one axis to be automatically mimicked for the other axis, i.e., the parameters of one axis are copied to the parameters of the other axis. When the parameters of one axis are modified, the parameters of the other axis are automatically changed to be the same. The user can select symmetric box 460 to make each direction on an axis mirror each other, i.e., the parameters in one direction are automatically copied to the other direction on that axis. If both boxes 458 and 460 are selected, the user need only edit force sensation parameters for one direction of one axis, and the force in all the other directions of all the axes will be characterized the same as the edited direction. Thus, boxes 458 and 460 allow easy specification of symmetric forces.

The main damper window 462 offers two modes: simple and advanced. The simple mode is shown in FIG. 12. In this mode, a column of represented liquid 464 is shown for the negative direction on the first axis, and a column of represented liquid 466 is shown for the positive direction on the first axis. The height of each liquid column indicates the magnitude of damping in that direction, where the height is equivalent to a damping constant b in the equation F=bV, where v is the velocity of the damped object and F is the resulting force.

When testing the feel of the damping force, the user moves the user object, such as a joystick, and feels the force sensation in real time. In interface 300, the middle line 468 represents the position of the user object. When the user moves the user object in the negative direction represented in window 462, the line 468 moves to the left. To the user, it looks as if the line is moving against a large column of water or liquid, and the feel of the user object feels the same way. As the line moves left, the column of liquid 464 gets thinner and the column of liquid 466 gets wider. In addition, liquid preferably is animated on display screen 20 to shoot out of left pipe 470 as the user moves the line left. This conveys the damping concept to the user in a graphical, intuitive way. A similar result occurs if the user moves the line 468 to the right, into column 466, except a smaller damping force is felt.

As described above, the normal procedure for a force designer in using interface 300 is to input parameters for a selected type of force sensation, test the way the force feels by manipulating the user object, adjusting the parameters based on the how the force feels, and iteratively repeating the steps of testing the way the force feels and adjusting the parameters until the desired force sensation is characterized. Normally, the user would then save the resulting parameter set describing this force sensation to a storage medium, such as a hard disk, CDROM, non-volatile memory, PCMCIA card, tape, or other storage space that is accessible to a computer desired to control the force feedback. The user also preferably assigns an identifier to the stored parameter set, such as a filename, so that this force sensation can be later accessed. Thus, other application programs running on a host computer can access the parameter set by this identifier and use the designed force sensation in an application, such as in a game, in a graphical user interface, in a simulation, etc.

The icons 451 and 453 are designed to help the user with the design of force sensations from previously stored force sensations. Clip objects icon 451, when selected, provides the user with a list or library of predefined, common force sensations that the user can use as a base or starting point, i.e., the user can modify a common spring condition configuration to quickly achieve a desired force. This library can be provided, for example, from commercial force providers or other sources. Favorites icon 453, when selected, causes a list of force sensations that the user himself or herself has previously stored on the storage medium and which can also be used as a starting point in designing force sensations.

Figure 13:
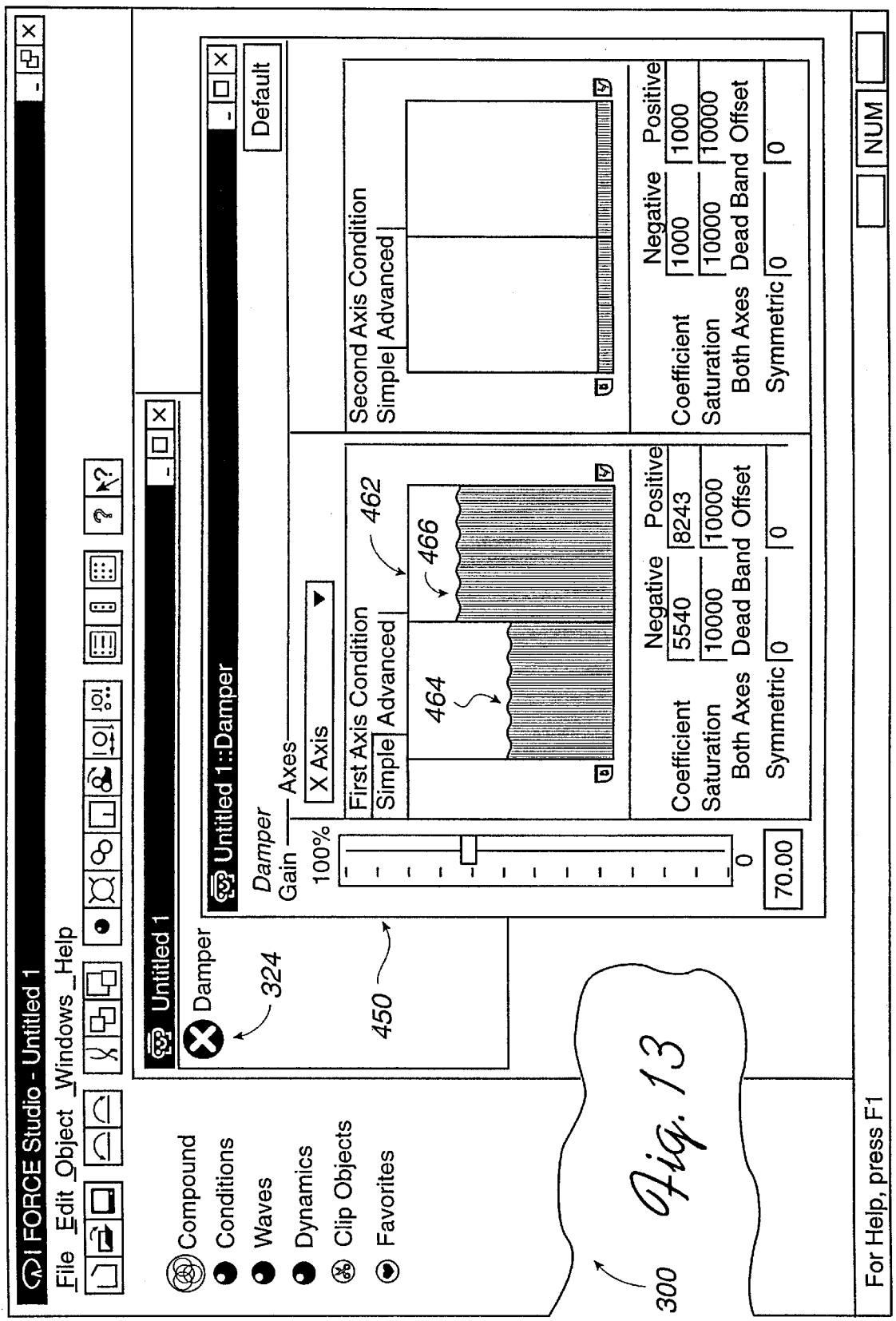

FIG. 13 illustrates interface 300 displaying the damping condition as in FIG. 12. However, in FIG. 13, the user has adjusted the columns of water to change the damping force, where column 464 has been decreased slightly, and column 466 has been increased by a large amount. In the preferred embodiment, the user can select a column using a cursor and drag the level of the liquid column up or down to adjust the damping force. This, in effect, adjusts the damping coefficient b in that direction. The user can also adjust coefficients by directly inputting values into fields 452.

Figure 14:
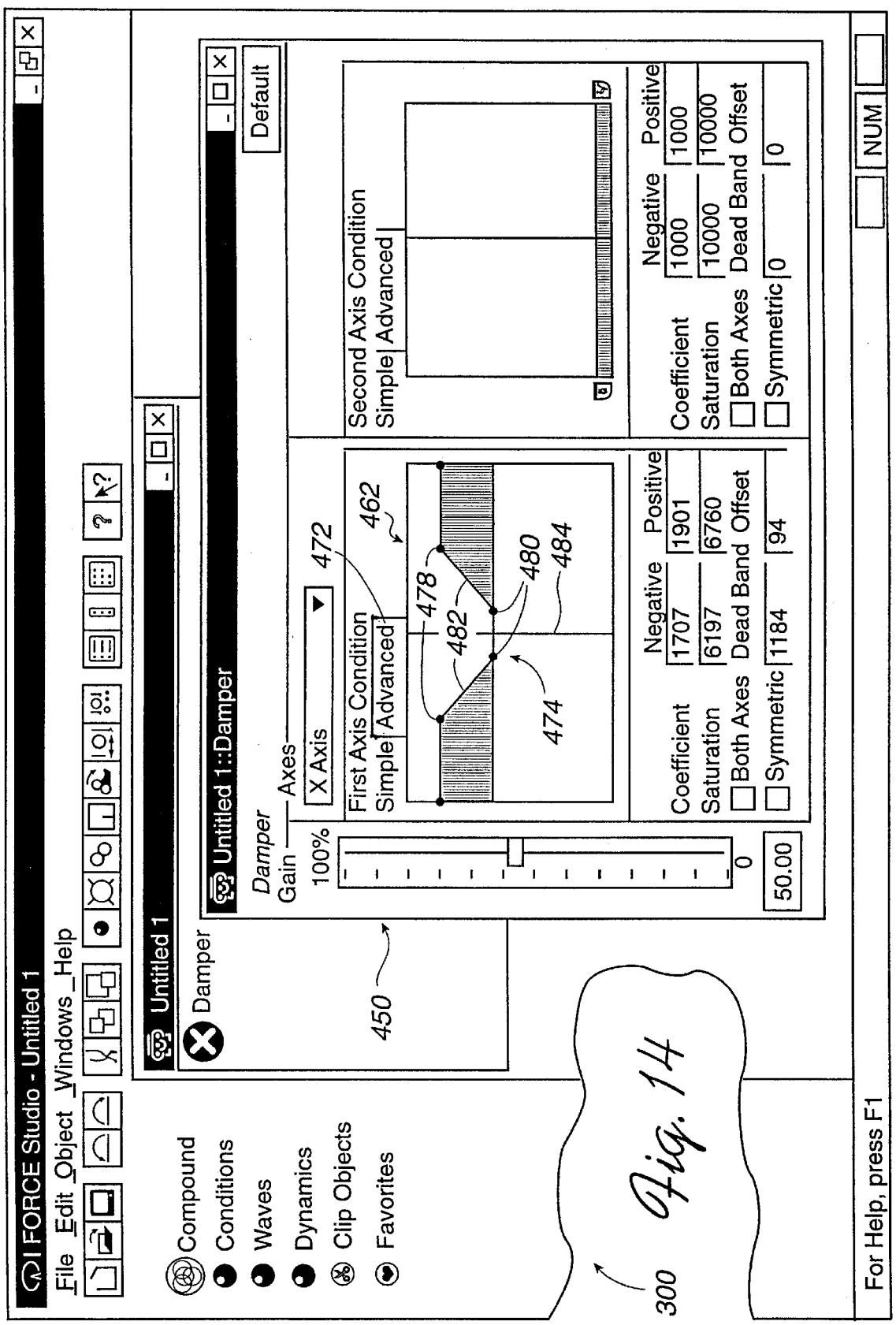
FIGS. 14–15 are diagrams of the interface of FIG. 5 in which an advanced mode design window for a damping condition is displayed.

FIG. 14 illustrates interface 300 displaying the damping condition of FIG. 12. However, in FIG. 14, the user has selected the advanced mode for graphically representing a damping condition. The user has selected button 472 to select advanced mode. In this mode, the columns of liquid 464 and 466 of simple mode are no longer displayed. Instead, a force vs. velocity profile 474 for a damping condition is displayed in window 462. The profile 474 represents all aspects of the damping condition, much of which was not represented in simple mode. For example, the saturation values are shown as control points 478, deadband is shown by control points 480, and coefficients are shown by the slope of lines 482. This representation is less intuitive than the simple model and would typically be used for designers have some experience in designing damping sensations. As with all the sensations, the user can move the user object in directions on the appropriate axis, and line 484 moves as a result based on the velocity of the user object, where the user feels the damping sensation provided by the displayed profile at the point where line 484 intersects a line 482. The displayed parameters are preferably sent to the local microprocessor of the interface device. The local microprocessor then outputs the specified force while the host computer displays the graphical changes in interface 300. In alternate embodiments, the host can directly output control signals to actuators to control any force sensations as well.

An inertia icon shown in palette 302 (of FIG. 16, for example) can be selected to similarly design an inertia condition in a window in design space 306. The inertia force can be graphically represented by a force versus acceleration profile, similar to the force versus velocity profile displayed for the advanced damping condition.

Figure 15:
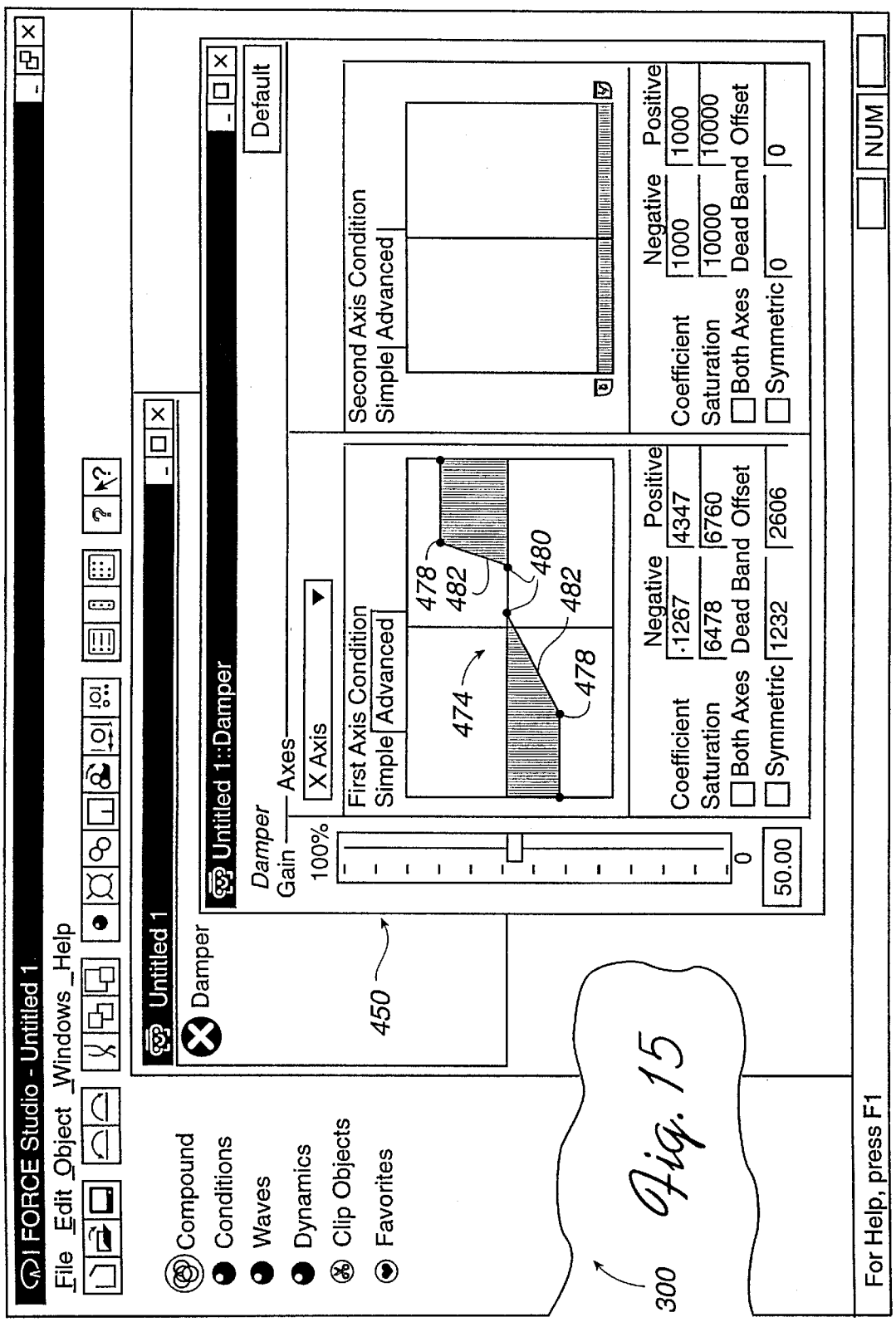

FIG. 15 illustrates the advanced damping model of FIG. 14 after the user has adjusted some of the parameters of the damping force sensation. In the preferred embodiment, the user may select the control points 478 and 480 and drag them to any desired position. This adjusts the saturation, offset and deadband values directly, and also adjusts the coefficients by adjusting the slope of lines 482.

Also in FIG. 15, the user has adjusted the negative direction coefficient to be negative, i.e. a negative slope. This type of control is meant for advanced users, since a negative damping force is unstable: it means that the faster the user moves the user object in that direction, the stronger will be the damping force urging the user object in that direction, rather than resisting the user object.

Figure 16:
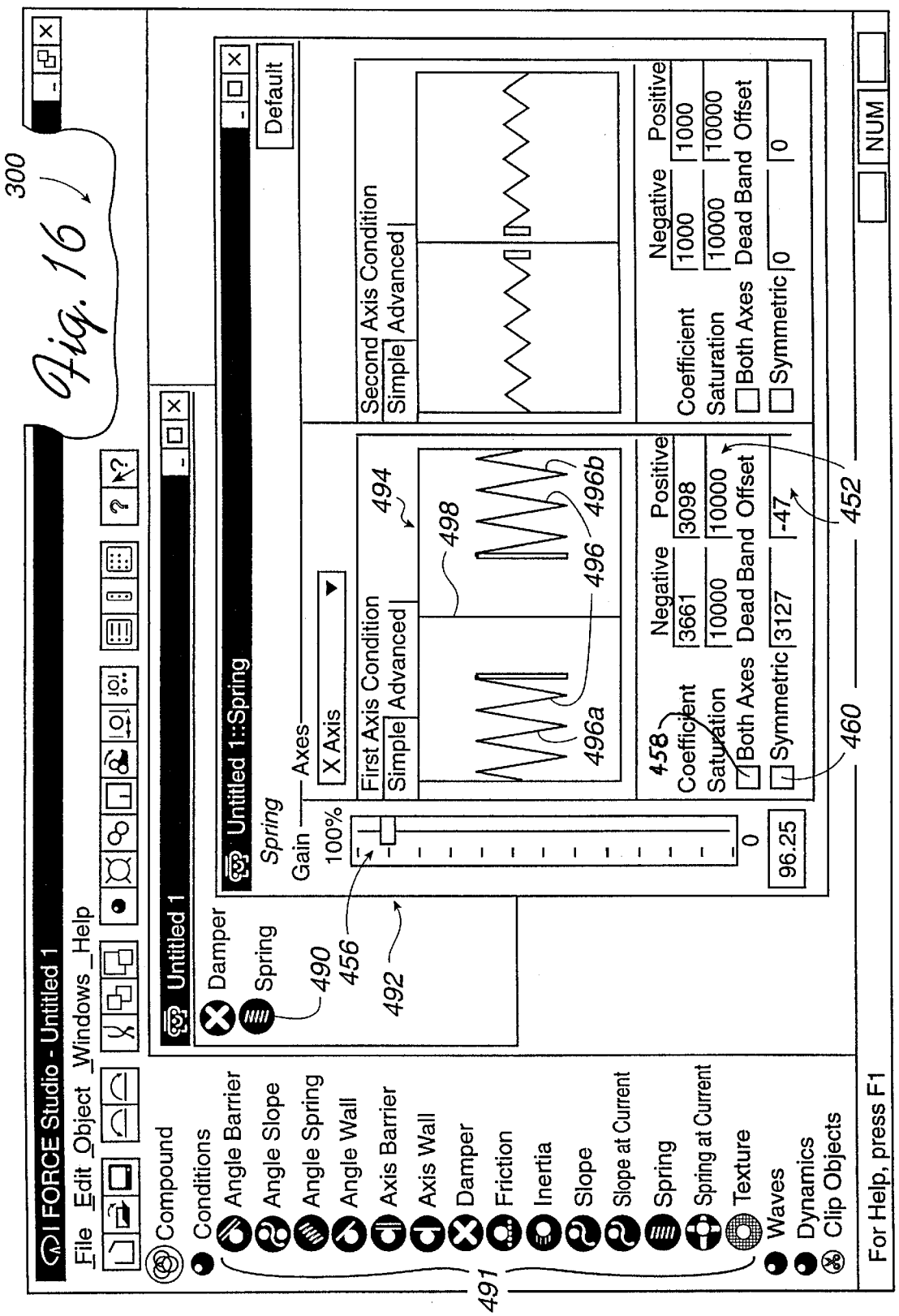

FIG. 16 illustrates interface 300 displaying an alternative graphical representation of a spring condition. FIG. 16 also shows the variety of conditions 491 available to be selected from the condition list. The representation used in FIG. 6 can be used for a spring condition as well. In FIG. 16, the user has selected spring icon 490 in the design space 306. A spring condition window 492 is displayed in the design space 306 when icon 490 is selected. As in the damping condition window 450 of FIG. 12, the spring window 492 includes parameters 452 for characterizing the spring force, as well as gain 456 and axis control 454. A window is displayed for each axis in which the force is to be applied. The greyed out window for the second axis condition indicates that no force is presently assigned to that axis.

In first axis window 494, a simple mode and advanced mode is available, similar to the damping condition. In FIG. 16, simple mode has been selected by the user. Spring images 496 are displayed from each edge of window 494, where spring image 496a is for the negative direction and spring image 496b is for the positive direction. When the user moves the user object along the displayed axis (the x-axis), line 498 moves in the corresponding direction. When the line 498 moves into a spring image 496, the microprocessor outputs the specified spring force on the user object so the user can feel the characterized force sensation. As the user object continues to be moved into the spring, the spring image compresses as a real spring would. The empty space between spring images 496 indicates the deadband region where no forces are output. It should be noted that the user will feel a spring force if any component of the user object's motion is along the x-axis; if the user moves the user object at a 45-degree angle (where the x-axis is at 0 degrees), then a component of the spring force in the x-axis will be felt. This component will be a weaker spring force than if the user object were moved directly on the x-axis. This is also preferably the case for all the conditions of the interface 300. In some alternate embodiments, the spring force might be turned off in all directions except for movement precisely (or within a tolerance) of the displayed axis.

Figure 17:
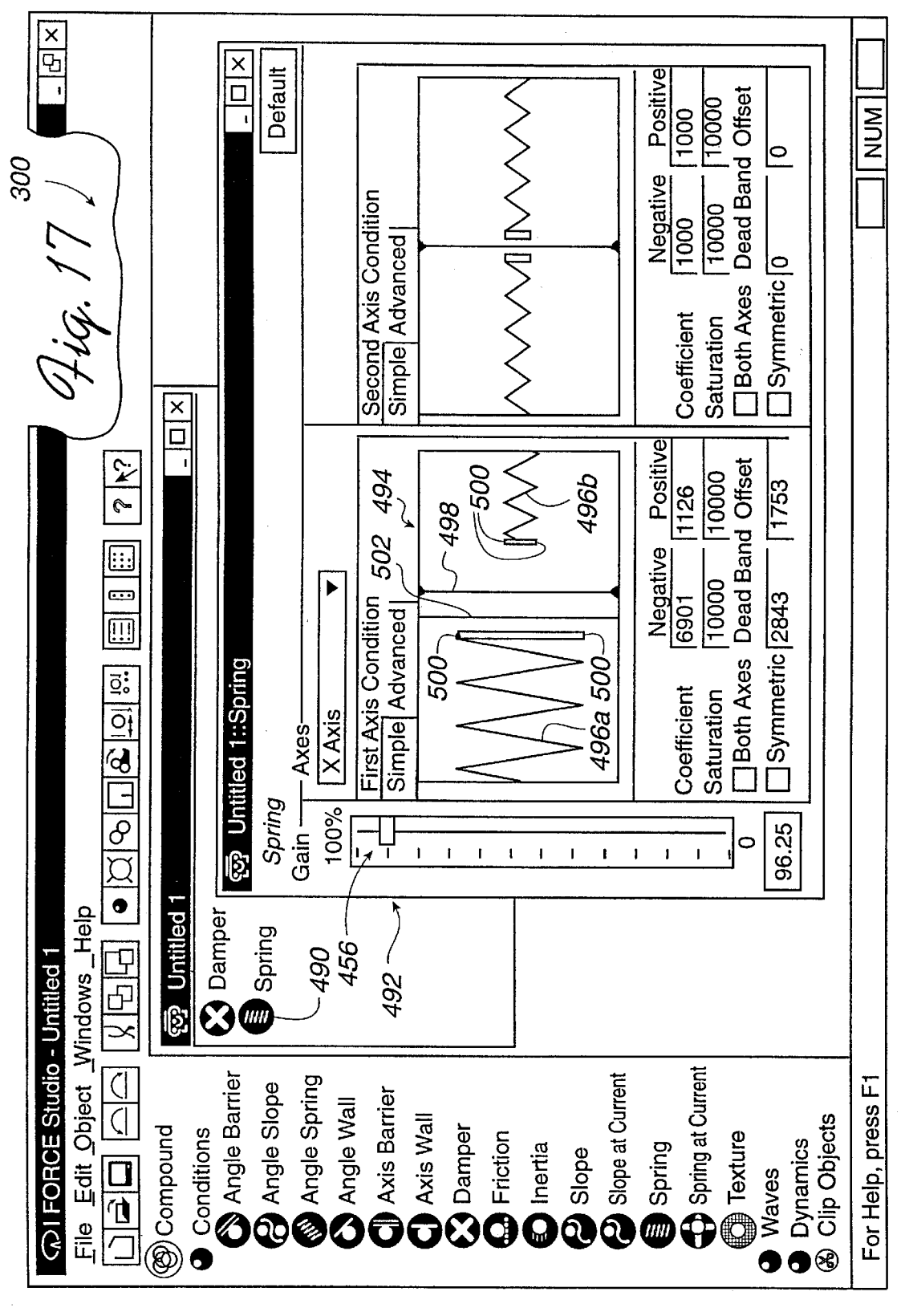

FIG. 17 illustrates spring condition window 492 of FIG. 16 after the user has adjusted the parameters of the spring force sensation. In the preferred embodiment, the user may adjust the stiffness (k) of the spring force by selecting control points 500 at the edges of the front of the spring images 496 with a cursor. The user can drag the control points to adjust the widths of the spring images, which in turn adjusts the stiffness parameter (where stiffness k is a constant in the equation F=kx, x being the displacement of the user object and F being the resulting force). A thicker spring image indicates a larger stiffness parameter, and a stronger spring force. Thus, image 496a is wide and indicates a large spring force in the negative direction, and the opposite in the positive direction.

The user may also move the front ends of the spring images closer together or further apart, thus adjusting the deadband and offset parameters. The current location of the user object is indicated by line 498; the dashed line 502 indicates the center position on the displayed axis. As parameters are adjusted, they are sent to the local microprocessor which then implements the newly characterized force on the user object (if appropriate).

Figure 18:
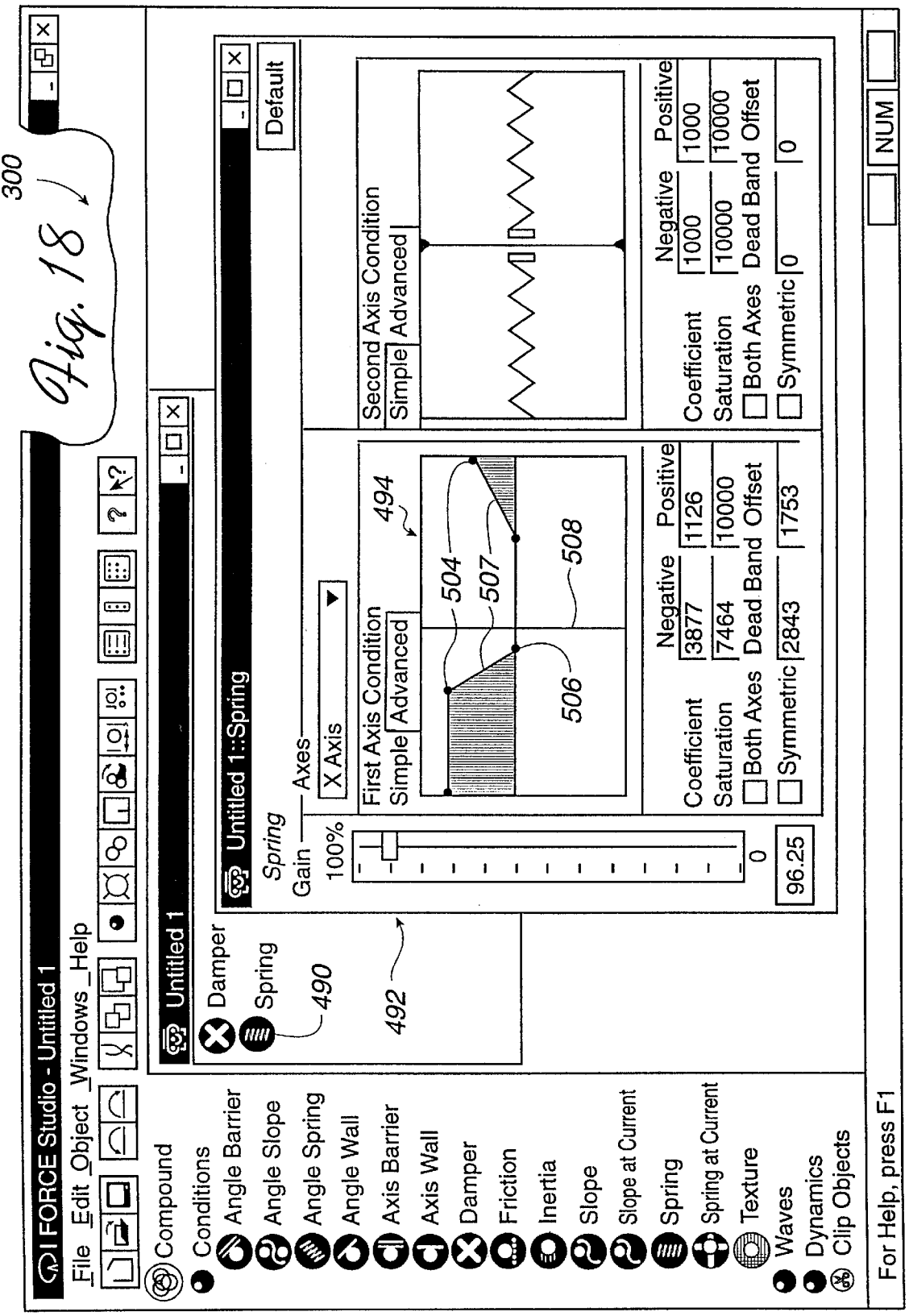
FIGS. 18–19 are diagrams of the interface of FIG. 5 in which an advanced mode design window for a spring condition is displayed.

FIG. 18 illustrates the advanced mode for the spring condition of FIG. 16. As in the damper condition of FIG. 14, the advanced spring condition shows a force vs. displacement profile in window 494 instead of the spring images 496. All the parameters for the spring condition are graphically represented in window 494, including saturation values as indicated by control points 504 (saturation values were not represented in the simple mode of FIG. 16). The deadband and offset are defined by control points 506, while the stiffness is indicated by lines 507. This representation is less intuitive than the simple model and would typically be used for designers have some experience in designing spring sensations. As with all the sensations, the user can move the user object in directions on the appropriate axis, and line 508 moves based on the displacement of the user object, where the user feels the spring sensation provided by the displayed profile when the line 508 intersects the lines 507. The steepness of the slope of lines 507 provides an intuitive representation of the amount of spring stiffness provided. The displayed parameters are preferably sent to the local microprocessor, which outputs the specified force on the user object while the host computer displays the graphical changes in interface 300.

As with the advanced damping model, the control points 504 and 506 may be moved by the user by selecting the desired point and dragging it to a new position. This adjusts the saturation, offset and deadband values directly, and also adjusts the stiffness by adjusting the slope of lines 507. A negative stiffness can also be specified, which is not possible in the simple mode of FIG. 16; but a negative stiffness is better represented as a slope with a different image as described below with reference to FIG. 21.

Figure 19:
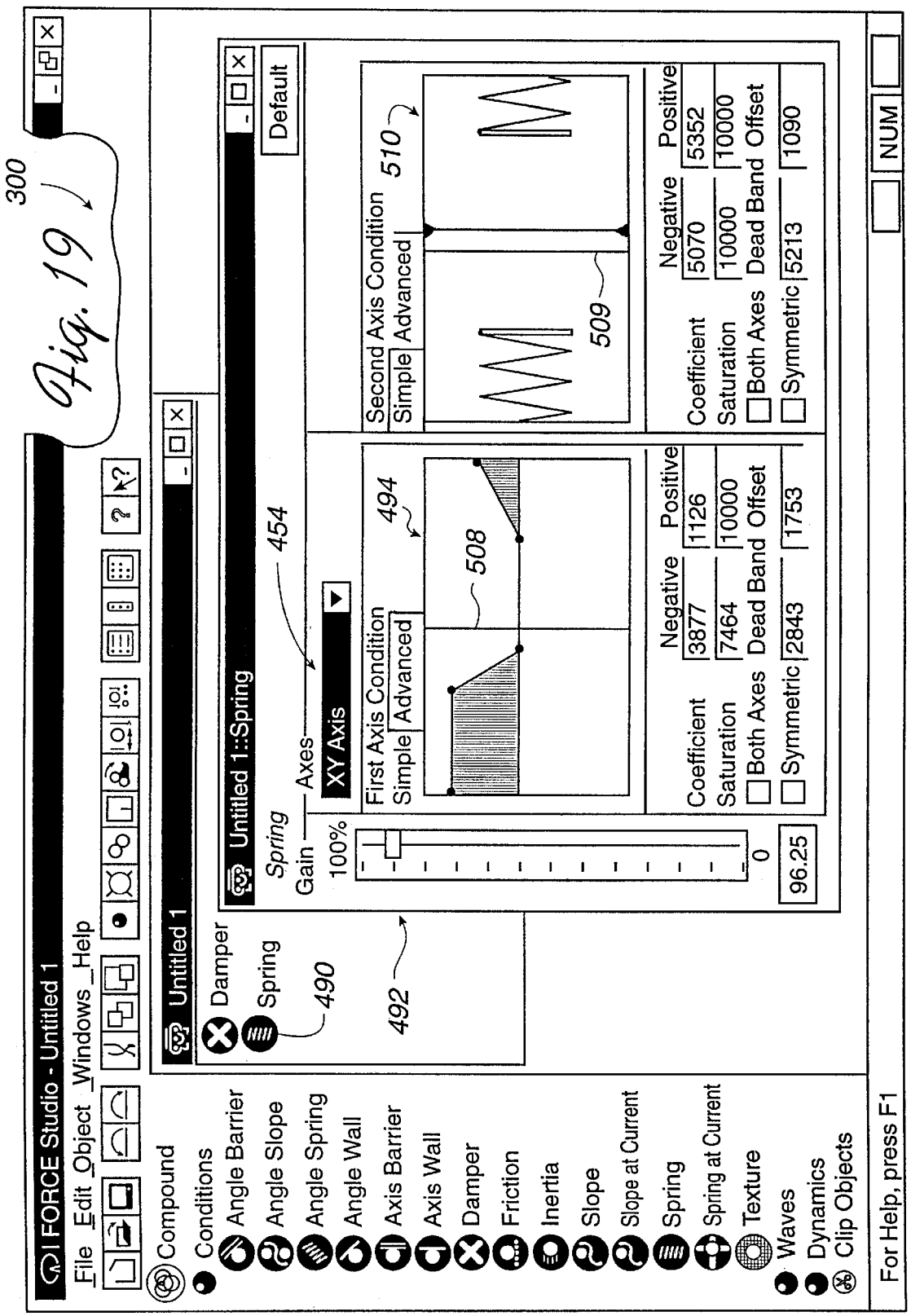

FIG. 19 illustrates interface 300 displaying active windows for both x- and y-axes of the interface device. Field 454 is adjusted by the user to display both axes. For the first axis (x-axis), displayed in window 494, the user has selected the advanced mode as described in FIG. 18. For the second axis (y-axis), displayed in window 510, the user has selected the simple mode as described in FIG. 17. When the user moves the user object, the line 508 moves simultaneously with line 509 as long as the user object movement has both x- and y components. If two simple modes are simulataneously displayed in windows 494 and 510, spring images in both axes may be compressed simultaneously with the appropriate movement of the user object.

Figure 20:
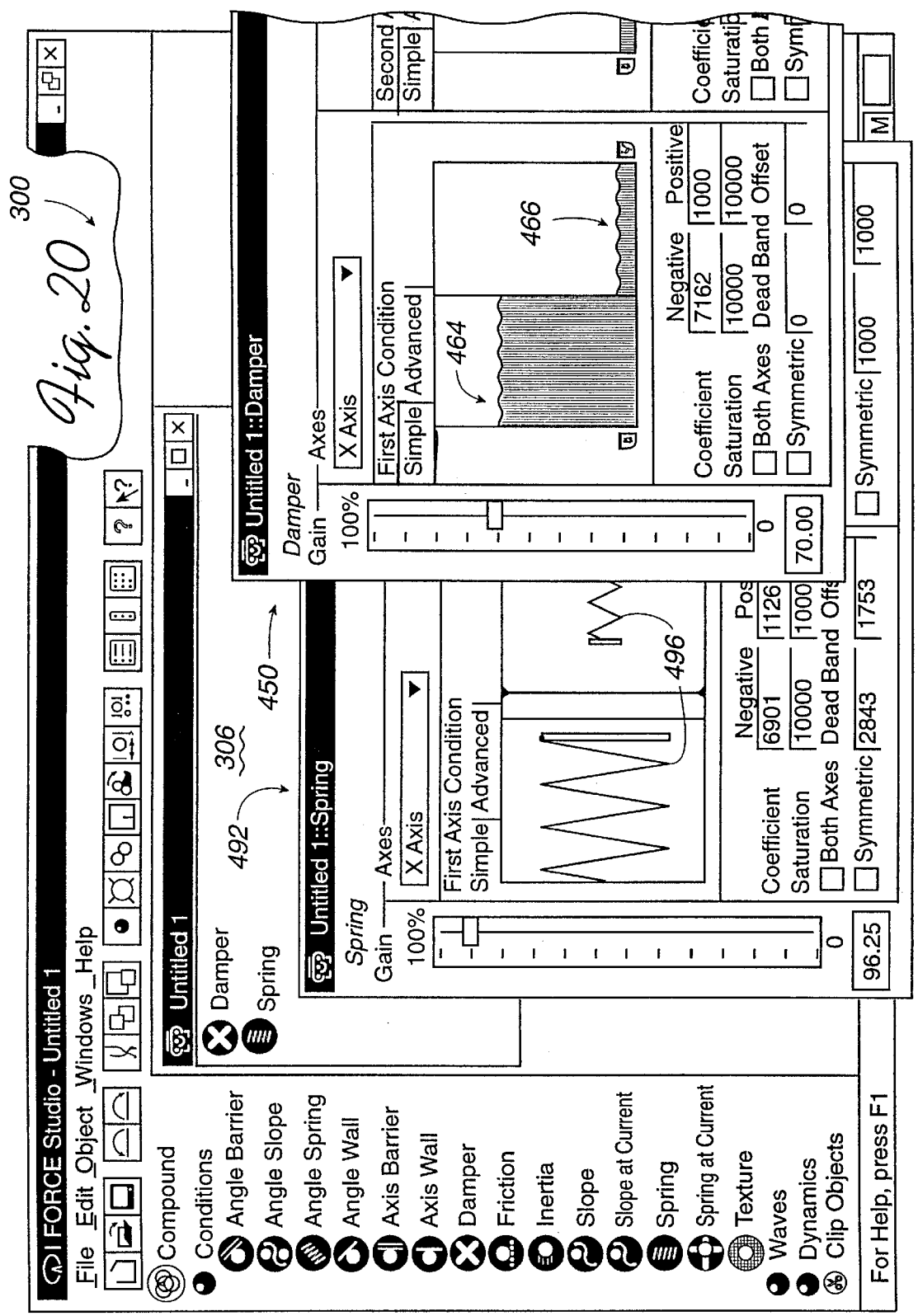
FIG. 20 is a diagram of the interface of FIG. 5 in which design windows for a compound force sensation are displayed.

FIG. 20 illustrates interface 300 displaying the damping condition window 450 of FIG. 12 simultaneously with spring condition window 492 in design space 306. This may indicate that the user is designing a compound force sensation consisting of two different force sensations. As shown, the user has designated the x-axis of the user object to have both a spring force, represented by spring images 496, as well as a damping force, represented by images 464 and 466. The user can test the resulting compound force sensation by moving the user object along the x-axis. The microprocessor is sent both sets of parameters and superimposes one force sensation on the other. Additional force sensations can similarly be dragged as icons into design space 306 and opened to windows by selecting the icons, thus creating a compound force sensation with many different individual sensations.

Figure 21:
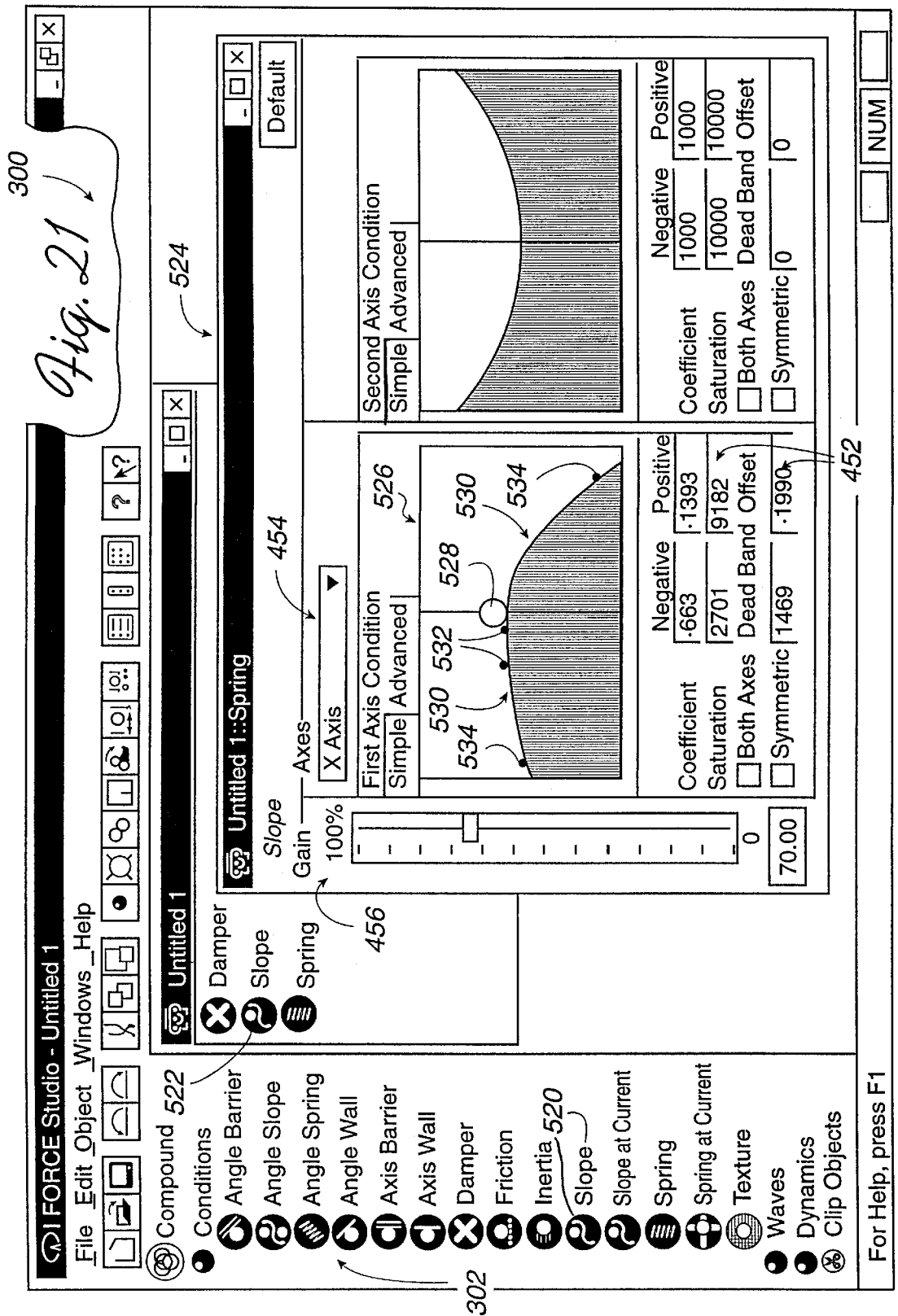
FIGS. 21–23 are diagrams of the interface of FIG. 5 in which a design window for a slope condition is displayed.

FIG. 21 illustrates interface 300 displaying a graphical representation of a slope condition. As shown, the user has selected slope icon 520 from the list of conditions displayed in sensation palette 302. The icon 522 is displayed in design space 306, and after the user selects icon 522, slope condition window 524 is displayed in design space 306. As in the other condition windows, slope condition window includes parameters 452, 454, and 456. A graphical representation of the slope condition is displayed in window 526. The user has selected simple mode in this example, and is only specifying a force in the first axis of the interface device (the advanced mode for the slope condition is preferably identical to the advanced mode of the spring condition, described above in FIGS. 18 and 19).

A slope condition is represented as a ball 528 controlled by the user and rolling on a hill 530. The ball 528 starts in the center of the hill, and as the user moves the user object to the right, the ball begins to roll down the hill to the right. A dashed line 529 is displayed through the middle of the ball and moves with the ball to indicate the position of the user object. As in the real-world equivalent, the ball moves faster the further away from the top it rolls. A corresponding force sensation is output on the user object during this visual representation, where the force sensation is provided as a negative spring stiffness. This is the same type of force as provided in the spring condition, except the stiffness k is a negative value. The further the user moves the user object from the flat top area of the hill, the stronger is the force pulling the user away from the top of the hill. This is an unstable type of force, since further one moves the user object in a direction, the greater the force in that direction. This type of force is well modelled by the ball on a hill representation, and allows the user to intuitively picture and design forces having a negative stiffness parameter.

The user may adjust the parameters of the slope condition by dragging control points provided on the hill image. Control points 532 control the size of the deadband and the offset, and is represented as the size and location of the flat top area of the hill. Control points 534 control the stiffness of the slope force, which is the curvature of the hill. The location where the hill changes from a curvy slope to a linear slope (at points 534) is the saturation value, which can be adjusted by moving control points 534.

Figure 22:
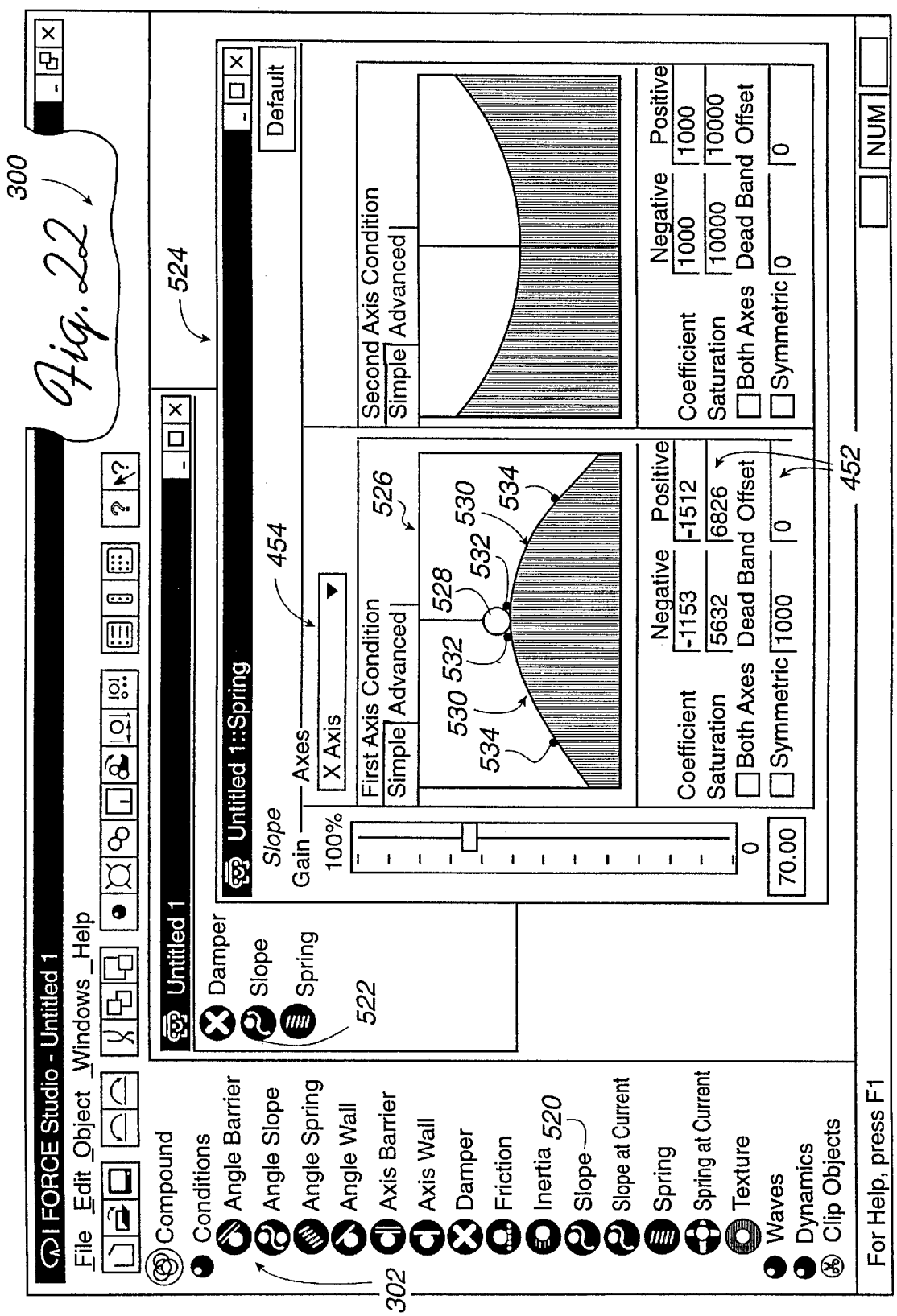

FIG. 22 illustrates another example of a graphical representation of the slope condition. In this example, the offset is zero, so the top of the hill is centered at the center point of the axis. Both sides of the hill have close to the same curvature, reflecting that the stiffness values in positive and negative directions are close to each other in value.

Figure 23:
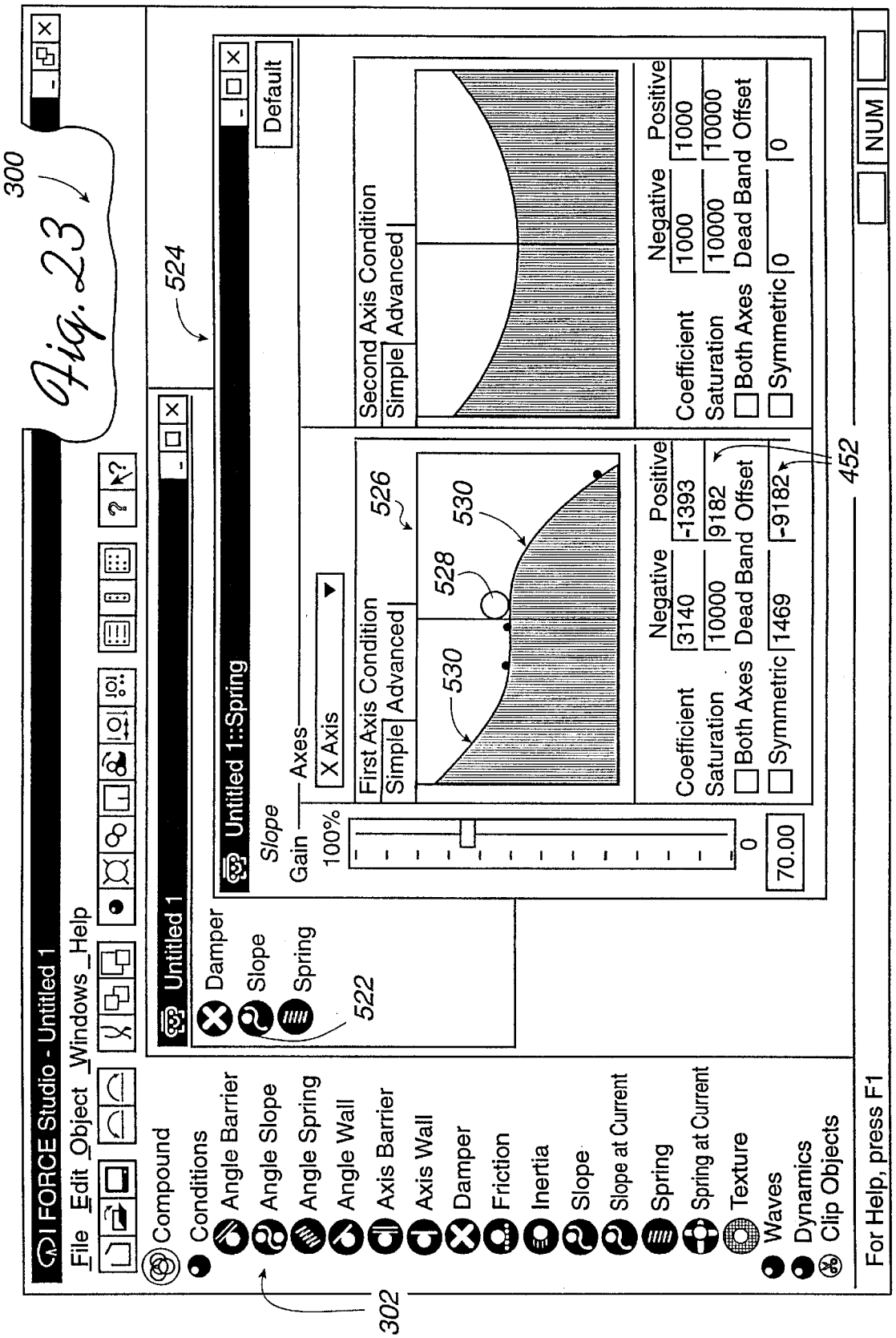

FIG. 23 illustrates a third example of a graphical representation of the slope condition. In this example, the user has defined a negative stiffness in the positive direction and a positive stiffness in the negative direction. The negative stiffness is represented as a downward slope of a hill, as in the examples of FIG. 21 and 22. The positive stiffness is represented as an upward slope of a hill. This upward slope is essentially a different way of representing a spring condition as in FIG. 16, which also is defined by a positive stiffness. The advantage to using the slope representation as in FIG. 23 over the spring representation of FIG. 16 is that an axis can be intuitively designed with a positive stiffness in one direction and a negative stiffness in the other direction, which is not as easily visualized using the spring graphical representation of FIG. 16.

Figure 24:
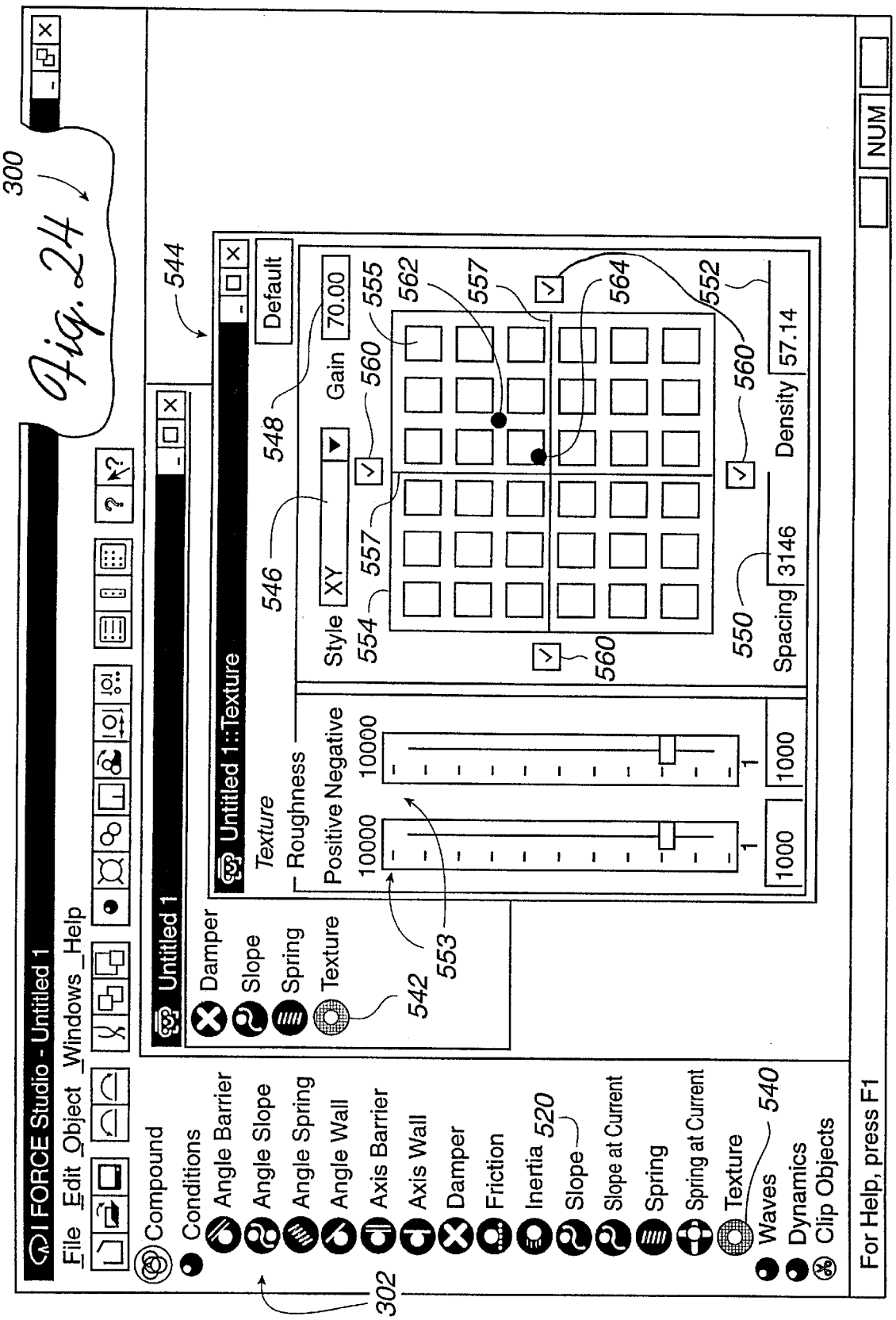
FIG. 24 is a diagram of the interface of FIG. 5 in which a design window for a texture condition is displayed.

FIG. 24 illustrates interface 300 displaying an alternate graphical representation of a texture condition. Either the representation of FIG. 24 or the representation of FIG. 8 may be used. The advantage to the representation in FIG. 24 is that both axes of the interface device are displayed in a single window or area.

In FIG. 24, the user has selected a texture condition icon 540 from sensation palette 302. The texture icon 542 has been dragged into design space 306 and has been selected, resulting in texture condition window 544 being displayed in the design space 306. Texture condition window includes a style parameter 546 which is similar to the axis field 454 of the damper and spring condition windows, allowing the user to select which axes the texture is to be provided. Gain parameter 548 is a global scaling factor for force magnitudes to, for example, adjust force output levels for different hardware. Spacing parameter 550 determines the spacing between the "bumps" of the texture. Since both x-axis and y-axis are selected in window 544, the spacing parameter 550 applies to both axes. Different spacing can be applied to each axis by individually selecting an axis in field 546 specifying the spacing for that axis, selecting the other axis in field 546, and specifying the spacing in that axis. Density parameter 552 determines the width or thickness of the bumps of the texture. When both axes are selected in field 546, the width in both axes is the same. The density for individual axes can be specified similarly to the spacing parameter 550. The roughness sliders allow the user to specify a roughness in positive and negative directions on the axes specified by the style parameter 546. The roughness indicates the intensity of the texture; for cases where texture is simulated by intermittent damping, it is the coefficient for damping in the bump regions.

Window 554 displays a graphical representation of the texture defined by the parameters and allows a user to adjust the parameters graphically. The texture is displayed as a field of rectangles 555 or squares, where the space between the rectangles is the spacing parameter and the size of the rectangles shows the density. Center lines 557 divide the field into four spatial quadrants, representing the workspace of the user object. The intersection of center lines 557 indicates the current position of the user object. Thus, when the user moves the user object in the two axes, the intersection moves accordingly. When the intersection moves over a rectangle 555, the microprocessor outputs a bump forces in accordance with the specified parameters. When the intersection is between rectangles 555, no force is output. In an alternative embodiment, the position of the user object can be indicated by a dot, circle or other graphical object, which can move in accordance with the user object.

Axis check boxes 560 allow the user to select which quadrants (or directions) on the axes are provided with the specified texture. If a box 560 is checked, the corresponding quadrant on that axis is provided with the texture; if the box is unchecked, the associated quadrant is not provided with the texture. The graphical representation 554 is updated accordingly. For example, if the left box 560 is unchecked, the left half of the display in window 554 is greyed out or shown as a solid color, indicating a lack of texture. Note that, for example, if the user object is positioned in the right half of display 554 and the left half of the display has no texture, the texture force is still output when the user object is moved to the left as long as the user object is positioned in the quadrant to the right of the center line 557.

If the user selects only a single axis in which to apply a texture using style parameter 546, the window 554 preferably displays lines, instead of squares, oriented perpendicularly to the selected axis, where the lines have a thickness equal to the density parameter and are spaced apart a distance equal to the spacing parameter.

The user can preferably graphical adjust the specified texture by selecting the spacing control point 562 and/or the density control point 564 with a cursor and dragging the selected control point in certain directions. For example, spacing control point 562 can be dragged to the left to decrease the spacing on the x-axis and y-axis, and can be dragged to the right for the opposite effect on the x- and y-axes. The density control point can similarly affect the density of the texture, as in field 552. Alternatively, four control points can be provided, where two of the control points control the spacing and density on one axis (or in one direction), and the other two of the control points control the spacing and density on the other axis (or direction).

Figure 25:
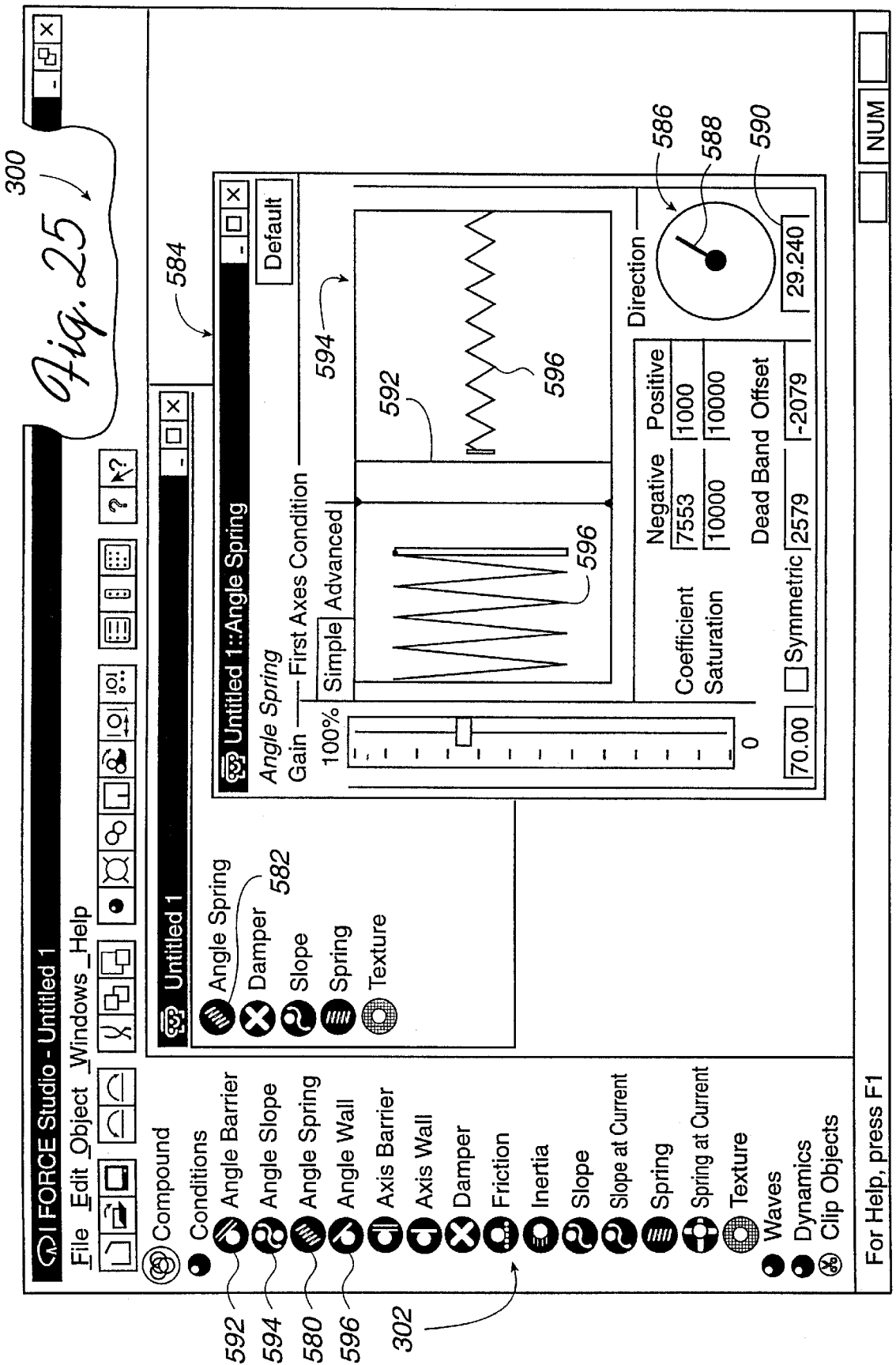
FIG. 25 is a diagram of the interface of FIG. 5 in which a design window for an angle spring condition is displayed.

FIG. 25 illustrates interface 300 displaying an angle spring condition. The user has selected the angle spring icon 580 from the sensation palette 302 and has selected the icon 582 in the design space 306 to cause angle spring window 584 to be displayed. An angle spring condition is similar to a spring condition as shown in FIG. 16, except that a direction of the spring force can be specified. In window 584, a direction dial 586 is provided to allow the user to specify a direction. The user may either select and drag the pointer 588 of the dial graphically to select an angle, or input an angle directly in field 590. Preferably, an angle spring always is defined in terms of 2 axes (or more), since the angle is defined within two degrees of freedom.

Window 594 displays the graphical representation of the angle spring. The axis (degree of freedom) represented in window 594 is the axis along the specified angle. The user moves the user object and dashed line 592 moves within spring window 594, similar to the embodiment of FIG. 16. Only the component of motion of the user object in the specified direction is displayed as line 592 moving. The full spring force indicated graphically by springs 596 will only be output on the user object if the user moves the user object in the direction specified by dial 588 and field 590. If the user moves the user object in other directions, only a component of the full force will be felt by the user, i.e., if the user moves along the x-axis (0 degrees) and a 30 degree spring force is specified, the user will feel a weaker spring force than if moving along the 30 degree direction.

Preferably, the other angle forces shown in palette 302, such as angle barrier 592, angle slope 594, and angle wall 596, have direction specification and output similar to the angle spring described above.

Other conditions are also listed in palette 302. The wall is a condition that provides an obstruction force to the movement of the user object, as discussed above with respect to FIGS. 9a and 9b. The location of the wall in provided axes in represented graphically by a large shaded line or block on an axis into which the user object is obstructed from penetrating. A barrier is similar to a wall, except the user object can penetrate the barrier and pop through to the other side of the barrier, and thus includes a thickness parameter which can be displayed graphically as a thickness of a block. The "spring at current" and "slope at current" conditions provide forces that are initiated at a current position of the user object; thus, a spring at current force will have an origin centered at the current location of the user object. This is useful for designing condition forces centered at other positions of the user object other that its origin position.

Figure 26:
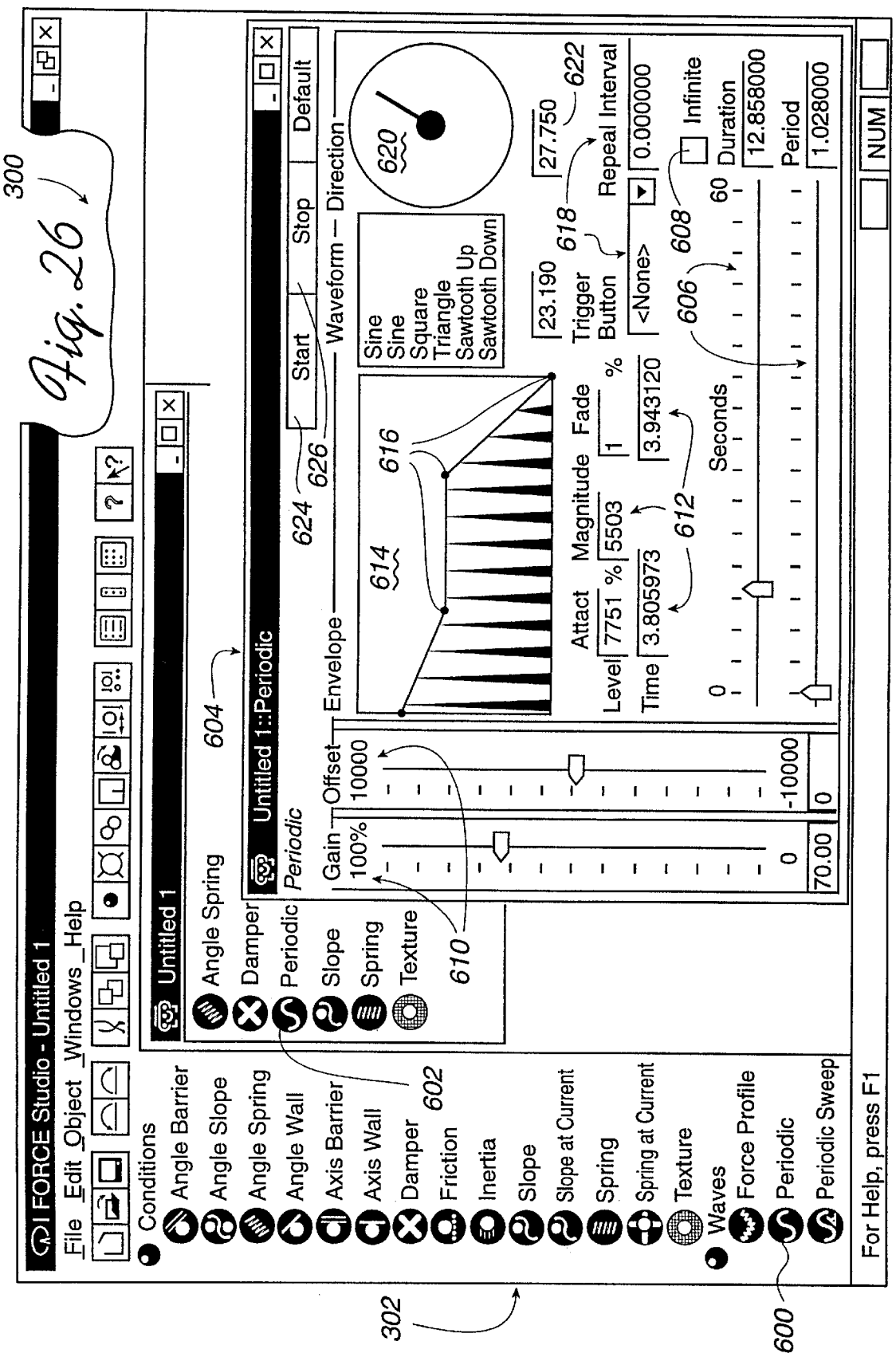
FIG. 26 is a diagram of the interface of FIG. 5 in which a design window for a periodic wave is displayed.

FIG. 26 illustrates interface 300 displaying another embodiment of a graphical representation of a wave or effect periodic force sensation. The user has selected a periodic effect icon 600 in palette 302, and has selected the icon 602 in design space 306 to display the periodic window 604. Periodic window 604 is similar to the periodic graphical representations of FIG. 10 and 11, described above. In window 604, the user is allowed to select the duration of the periodic wave using sliders 606, and may also select an infinite duration with box 608. The gain and offset may be selected using sliders 610, and other parameters are provided in fields 612. A graphical representation of the periodic waveform is shown in window 614. The parameters in fields 612 can be graphically adjusted by the user by dragging control points 616 of the waveform, as described with reference to FIG. 11. A frequency of the waveform can be adjusted by dragging a displayed wave to widen or narrow the displayed oscillations of the wave. Trigger buttons for the periodic wave can be determined in fields 618, and the direction of the periodic wave in the user object workspace is determined using dial 620 and field 622.

To test the specified periodic wave, the user preferably selects start button 624, which instructs the microprocessor to output the specified force sensation over time to the user object so the user can feel it. In the preferred embodiment, a graphical marker, such as a vertical line or pointer, scrolls across the display window 614 from left to right indicating the present portion or point on the waveform currently being output. Since graphical display is handed by the host computer and force wave generation is (in one embodiment) handled by a local microprocessor, the host display of the marker needs to be synchronized with the microprocessor force generation at the start of the force output. The user can stop the output of the periodic sensation by selecting the stop button 626.

While this invention has been described in terms of several preferred embodiments, it is contemplated that alterations, permutations and equivalents thereof will become apparent to those skilled in the art upon a reading of the specification and study of the drawings. For example, many different parameters can be associated with dynamic sensations, conditions, and effects to allow ease of specifying a particular force sensation. These parameters can be presented in the graphical interface of the present invention. Many types of different visual metaphors can be displayed in the interface tool of the present invention to allow a programmer to easily visualize changes to a force sensation and to enhance the characterization of the force sensation. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A method for implementing a force sensation design interface, said method comprising:

displaying said force sensation design interface on a display device of a host computer;

receiving input from a user to said force sensation design interface, said input selecting a type of force sensation to be commanded by said host computer and output by a force feedback interface device, said force feedback interface device including a user manipulatable object graspable by a device user and moveable in a degree of freedom;

receiving input from said user defining physical characteristics of said selected force sensation;

displaying a graphical representation of said selected force sensation as characterized by said user, wherein said graphical representation provides said user with a visual demonstration of a feel of said characterized force sensation;

commanding said characterized force sensation to said force feedback interface device coupled to said host computer such that actuators of said force feedback interface device output said force sensation on said user manipulatable object in conjunction with said visual demonstration of said feel of said characterized force sensation; and receiving additional changes to said characterized force sensation from said user after said force sensation is output and displaying said additional changes in said graphical representation, wherein a force sensation modified in accordance with said additional changes is output by said actuators on said user manipulatable object.

2. A method as recited in claim 1 further comprising storing a plurality of parameters characterizing said force sensation to a storage medium accessible to said host computer.

3. A method as recited in claim 2 further comprising accessing said stored plurality of parameters from an application program different than said design interface, said application program using said plurality of parameters to output said characterized force sensation during execution of said application program.

4. A method as recited in claim 3 wherein said application program is a game program.

5. A method as recited in claim 1 wherein a local microprocessor, included in said force feedback interface device and separate from said host computer, receives a command from said host computer to control said actuators to output said characterized force sensation.

6. A method as recited in claim 1 wherein a plurality of force sensations are selectable by said user, and wherein said selectable force sensations include conditions, effects, and dynamics.

7. A method as recited in claim 1 wherein said user may select an advanced mode or a simple mode of graphically representing said force sensation in said force sensation design interface.

8. A method as recited in claim 5 wherein in said advanced mode, a force versus user object motion profile is displayed, wherein said user may adjust parameters of said selected force sensation by dragging displayed control points of said profile.

9. A method as recited in claim 1 wherein said user may characterize said force sensation independently in different directions of a degree of freedom of said interface device.

10. A method as recited in claim 1 wherein said selected force sensation is a damping condition, and wherein said graphical representation includes an image of a column of liquid into which said user may move a controlled graphical object by moving said user manipulatable object such that said user feels said characterized damping force sensation.

11. A method as recited in claim 1 wherein said selected force sensation is a spring condition, and wherein said graphical representation is an image of said user manipulatable object and an image of a spring, wherein said user may adjust a thickness of said spring to adjust a stiffness of said spring condition.

12. A method as recited in claim 1 wherein said selected force sensation is a slope condition, and wherein said graphical representation includes an image of a hill on which a graphical object is positioned, wherein a position of said graphical object is controlled by a position of said user object, such that a force having a stiffness is applied to said user object when said graphical object is moved across said hill.

13. A method as recited in claim 12 wherein said graphical object controlled by said user manipulatable object is a ball that may be rolled across said hill.

14. A method as recited in claim 13 wherein said stiffness of said force is negative when said hill has a downward slope, and wherein said stiffness is positive when said hill has an upward slope.

15. A method as recited in claim 1 wherein said selected force sensation is a texture condition, and wherein said graphical representation includes images of a plurality of bumps representing a spacing and density of said texture.

16. A method as recited in claim 15 wherein a spacing and density of said bumps can be adjusted by said user by dragging at least one control point displayed in said design interface.

17. A method as recited in claim 1 wherein said selected force sensation is a periodic force sensation, and wherein said graphical representation is an image of a periodic waveform.

18. A method as recited in claim 17 wherein said characterization includes specifying an envelope for said periodic waveform, said envelope being displayed in said graphical representation.

19. A method as recited in claim 1 further comprising displaying a graphical representation of a second force sensation selected and characterized by said user, wherein both said selected force sensations are commanded to be simultaneously output on said user manipulatable object.

20. A method for implementing a force sensation design interface for designing a slope condition, the method comprising:

displaying said force sensation design interface on a display device of a host computer, said force sensation design interface including a graphical representation of a slope condition;

receiving input from a user to said force sensation design interface, said input defining physical characteristics of said slope condition to be commanded by said host computer and output by a force feedback interface device, said force feedback interface device including a user manipulatable object graspable by a device user and moveable in a degree of freedom;

adjusting said graphical representation of said slope condition in accordance with said input from said user; and receiving input from said force feedback interface device indicating said user is moving said user manipulatable object, and commanding said characterized slope condition to said force feedback interface device such that actuators of said force feedback interface device output forces of said slope condition on said user manipulatable object in conjunction with updating said graphical representation to reflect a current position of said user manipulatable object, said graphical representation providing said user with a visual demonstration of a feel of said characterized slope condition.

21. A method as recited in claim 20 wherein said graphical representation of said slope condition includes an image of a hill and a graphical object positioned on said hill, wherein a position of said graphical object corresponds to a position of said user manipulatable object.

22. A method as recited in claim 21 wherein said graphical object is a ball that may be rolled up or down said hill.

23. A method as recited in claim 21 wherein said forces of said slope condition have a negative stiffness, wherein a side of said hill corresponding to said negative stiffness has a downward curvature.

24. A method as recited in claim 23 wherein the further said ball is moved down said side of said hill, the greater the force pushing said user manipulatable object away from a center position of said user manipulatable object.

25. A method as recited in claim 21 wherein said forces of said slope condition have a positive stiffness, wherein a side of said hill corresponding to said positive stiffness has an upward curvature.

26. A method as recited in claim 25 wherein the further said ball is moved up said side of said hill, the greater the force pushing said user manipulatable object toward a center position of said user manipulatable object.

27. A method as recited in claim 22 wherein one side of said hill has a downward slope indicating a force with a negative stiffness in one direction, and wherein the other side of said hill has an upward slope indicating a force with a positive stiffness in the other direction.

28. A system for allowing a user to intuitively design spatially varying force feedback sensations, said system comprising:

a host computer system displaying a force feedback design interface on a display device, said force feedback design interface displaying a graphical representation of a force sensation selected by a user, wherein said user can adjust characteristics of said selected force sensation by inputting information to said design interface, said characteristics including stiffness, deadband and offset parameters;

a force feedback interface device coupled to said host computer system, said force feedback interface device receiving said stiffness, deadband and offset parameters and outputting said selected force sensation on a user object of said interface device when commanded by said host computer system, wherein said interface device outputs a modified force sensation on said user object corresponding to adjustments to said force sensation made by said user; and saving said stiffness, deadband, and offset parameters to a storage medium accessible by said host computer system, said parameters being provided with an identifier to identify said parameters as a set defining a particular force sensation.

29. A system as recited in claim 28 wherein said force feedback interface device includes a microprocessor separate from said host computer system, said microprocessor receiving commands from said host computer system, reading sensors of said interface device and reporting positions of said user object to said host computer system, and commanding actuators of said interface device to output said force sensation on said user object.

30. An apparatus providing a force sensation design interface for designing a force sensation to be output to a force feedback interface device, the apparatus comprising:

means for displaying said force sensation design interface on a display device of a host computer, said force sensation design interface including a graphical representation of a force sensation;

means for receiving input from a user to said force sensation design interface, said input defining physical characteristics of said force sensation to be commanded by said host computer and output by a force feedback interface device, said force feedback interface device including a user manipulatable object graspable by a device user and moveable in a degree of freedom;

means for adjusting said graphical representation of said force sensation in accordance with said input from said user;

means for receiving input from said force feedback interface device indicating said user is moving said user manipulatable object, and commanding said characterized force sensation to said force feedback interface device such that actuators of said force feedback interface device output said force sensation on said user manipulatable object in conjunction with updating said graphical representation to reflect a current position of said user manipulatable object, said graphical representation providing said user with a visual demonstration of a feel of said characterized force sensation; and means for writing data describing said physical characteristics of said force sensation to a storage medium.

31. A computer readable medium including program instructions for providing a force sensation design interface implemented by a computer, said program instructions causing said computer to perform steps comprising:

displaying a design interface on a display device of said computer;

receiving input in said design interface from a user, said input selecting a type of force sensation to be commanded by said computer and output by a force feedback interface device coupled to said computer, said force feedback interface device including a user manipulatable object graspable by a device user and moveable in a degree of freedom;

receiving input from said user to specify parameters which define characteristics of said selected force sensation;

displaying a graphical representation of said characterized force sensation in said design interface, wherein said graphical representation includes visual representations of said parameters such that said user can view an effect of said parameters on said force sensation; and commanding said characterized force sensation to said force feedback interface device coupled to said computer such that actuators of said force feedback interface device output said force sensation on said user manipulatable object in conjunction with a visual demonstration of said feel of said characterized force sensation.

32. A computer readable medium as recited in claim 31 including program instructions for causing said computer to write said parameters to a storage medium, said parameters being accessible to application programs implemented on said computer and controlling force feedback.

33. A computer readable medium as recited in claim 32 including program instructions for causing said computer to update said graphical representation in accordance with said force sensation being output on said user manipulatable object.

34. A computer readable medium as recited in claim 32 wherein said visual demonstration includes moving a graphical object in correspondence with said user manipulatable object, wherein when said force sensation is output on said user manipulatable object, said graphical object engages an image of said representation.

35. A computer readable medium as recited in claim 34 wherein said image of said representation includes an image of a spring displayed for a spring force sensation.

36. A computer readable medium as recited in claim 34 wherein said image of said representation includes an image of a column of liquid displayed for a damping force sensation.

37. A method for graphically allowing a user to design a feel of a simulated spring sensation to be displayed by a force feedback interface device coupled to a host computer, said method comprising:

displaying a graphical profile that is representative of a force output at different displacements of a user manipulatable object of said force feedback interface device, wherein said force provides said simulated spring sensation;

providing control points on said graphical profile that can be manipulated by said user to modify the feel of said simulated spring sensation; and causing said simulated spring sensation to be output by actuators of said force feedback interface device coupled to said host computer such that said actuators of said force feedback interface device modify an output force as a function of displacement of said user manipulatable object of said force feedback interface device in accordance with requirements of said graphical profile of said simulated spring sensation.

38. A method as recited in claim 37 wherein said graphical profile includes visual representations of a center offset, a deadband, a positive stiffness, and a negative stiffness.

39. A method as recited in claim 38 wherein at least one of said control points allows said user to modify a size of said deadband of said simulated spring sensation.

40. A method as recited in claim 37 wherein a combination of two of said control points allows said user to modify said deadband and said center offset of said simulated spring sensation.

41. A method as recited in claim 37 wherein at least one of said control points allows said user to modify a saturation level of said simulated spring sensation.

42. A method as recited in claim 37 wherein at least two of said control points allow said user to modify a positive saturation level and a negative saturation level of said simulated spring sensation.

43. A method as recited in claim 37 wherein a manipulation of one of said control points affects a stiffness of said simulated spring sensation.

44. A method as recited in claim 37 wherein a manipulation of one of said control points affects a positive stiffness of said simulated spring sensation and a manipulation of another of said control points affects a negative stiffness of said simulated spring sensation.

45. A method as recited in claim 37 wherein a symmetry mode can be selected that causes said graphical profile to remain symmetrical about a center regardless of how said user manipulates said control points.

46. A method as recited in claim 45 wherein said symmetry mode allows said user to manipulate one of said control points to modify a positive stiffness of said simulated spring sensation and said host computer automatically updates a negative stiffness to maintain a symmetry of said graphical profile.

47. A method as recited in claim 43 wherein one of said control points can be pulled below a displayed horizon line to cause a stiffness parameter to become a negative value and therefore represent an unstable spring sensation.

48. A method as recited in claim 37 wherein said graphical profile is associated with a specific axis of motion of said user manipulatable object, wherein said user manipulatable object can be moved in a plurality of axes of motion.

49. A method as recited in claim 37 wherein a mode can be selected by said user that associates said graphical profile with a simulated spring sensation that is implemented on multiple axes of said force feedback interface device simultaneously.

50. A method as recited in claim 37 wherein said graphical profile can be displayed at a given angle in a two axis plane, said angle being selectable by said user.

51. A method for graphically allowing a user to design a feel of a simulated damper sensation to be displayed by a force feedback interface device coupled to a host computer, said method comprising:

displaying a graphical profile that is representative of a force output at different displacements of a user manipulatable object of said force feedback interface device, wherein said force provides said simulated damper sensation;

providing control points on said graphical profile that can be manipulated by said user to modify the feel of said simulated damper sensation; and causing said simulated damper sensation to be output by actuators of said force feedback interface device coupled to said host computer such that said actuators of said force feedback interface device modify an output force as a function of velocity of said user manipulatable object of said force feedback interface device in accordance with requirements of said graphical profile of said simulated damper sensation.

52. A method as recited in claim 51 wherein said graphical profile includes visual representations of a deadband, a positive damping force, and a negative damping force.

53. A method as recited in claim 51 wherein at least one of said control points allows said user to modify a size of said deadband of said simulated damper sensation.

54. A method as recited in claim 51 wherein a combination of two of said control points allows said user to modify said deadband and said center offset of said simulated damper sensation.

55. A method as recited in claim 51 wherein at least one of said control points allows said user to modify a saturation level of said simulated damper sensation.

56. A method as recited in claim 51 wherein at least two of said control points allow said user to modify a positive saturation level and a negative saturation level of said simulated damper sensation.

57. A method as recited in claim 51 wherein a manipulation of one of said control points affects a damping magnitude of said simulated damper sensation.

58. A method as recited in claim 51 wherein a manipulation of one of said control points affects a positive damping of said simulated damper sensation and a manipulation of another of said control points affects a negative damping of said simulated damper sensation.

59. A method as recited in claim 51 wherein a symmetry mode can be selected that causes said graphical profile to remain symmetrical about a center regardless of how said user manipulates said control points.

60. A method as recited in claim 59 wherein said symmetry mode allows said user to manipulate one of said control points to modify a positive damping magnitude of said damper sensation and said host computer automatically updates a negative damping magnitude to maintain a symmetry of said graphical profile.

61. A method as recited in claim 58 wherein one of said control points can be pulled below a displayed horizon line to cause a damping parameter to become a negative value and therefore represent an unstable damper sensation.

62. A method as recited in claim 51 wherein said graphical profile is associated with a specific axis of motion of said user manipulatable object, wherein said user manipulatable object can be moved in a plurality of axes of motion.

63. A method as recited in claim 51 wherein a mode can be selected by said user that associates said graphical profile with a simulated damper sensation that is implemented on multiple axes of said force feedback interface device simultaneously.

64. A method as recited in claim 51 wherein said graphical profile can be displayed at a given angle in a two axis plane, said angle being selectable by said user.

65. A graphical method for allowing a user to design a feel of a simulated vibration sensation to be displayed by a force feedback interface device coupled to a host computer, said method comprising:

displaying a graphical profile that is representative of a force output over a time period, wherein said force provides said simulated vibration sensation;

providing control points on said graphical profile that can be manipulated by said user to modify the feel of said simulated vibration sensation; and causing said simulated vibration sensation to be output to a user by actuators of said force feedback interface device coupled to said host computer such that said actuators of said force feedback interface device modify said output force as a function of time of said force feedback interface device in accordance with requirements of said graphical profile of said simulated vibration sensation.

66. A method as recited in claim 65 wherein said graphical profile includes a waveform fitted within an envelope.

67. A method as recited in claim 65 wherein said graphical profile includes a waveform, and wherein at least one of said control points allows said user to modify a magnitude of said waveform.

68. A method as recited in claim 65 wherein said graphical profile includes a waveform, and wherein at least one of said control points allows said user to modify an impulse level of said waveform.

69. A method as recited in claim 65 wherein said graphical profile includes a waveform, and wherein at least one of said control points allows said user to modify attack characteristics of said waveform.

70. A method as recited in claim 65 wherein said graphical profile includes a waveform, and wherein at least one of said control points allows said user to modify fade parameters of said waveform.

71. A method as recited in claim 65 wherein said graphical profile is associated with a specific axis of motion of a user manipulatable object of said force feedback interface device, wherein said user manipulatable object can be moved in a plurality of axes of motion.

72. A method as recited in claim 71 wherein a mode can be selected by said user that associates said graphical profile with a simulated vibration sensation that is implemented on multiple axes of said force feedback interface device simultaneously.

73. A method as recited in claim 71 wherein said graphical profile can be displayed at a given angle in a two axis plane, said angle being selectable by said user.

74. A method as recited in claim 65 wherein said graphical profile includes a waveform, and wherein a type of said waveform can be selected by said user from a set that includes a sine wave and a square wave.

* * * * *